US008850315B1

(12) United States Patent
Rogers et al.

(10) Patent No.: US 8,850,315 B1
(45) Date of Patent: Sep. 30, 2014

(54) SYSTEM AND METHOD FOR SUPERIMPOSING A CONTEXT-SENSITIVE VIRTUAL AGENT ON A WEB-BASED USER INTERFACE

(71) Applicants: Cloud Coaching International LLC, Houston, TX (US); 4What LLC, Naples, FL (US)

(72) Inventors: Walter Rogers, Rancho Santa Fe, CA (US); James J. Cossetta, Naples, FL (US); Rick D. Kerry, Fort Myers, FL (US); Wade G. Mastro, Naples, FL (US); Patrick R. Atwood, Mooresville, NC (US)

(73) Assignees: Cloud Coaching International LLC, Houston, TX (US); 4What LLC, Naples, FL (US)

( * ) Notice: Subject to any disclaimer, the term of this patent is extended or adjusted under 35 U.S.C. 154(b) by 0 days.

(21) Appl. No.: 14/025,754

(22) Filed: Sep. 12, 2013

Related U.S. Application Data

(60) Provisional application No. 61/845,274, filed on Jul. 11, 2013.

(51) Int. Cl.
*G06F 3/0481* (2013.01)
*G06F 3/0482* (2013.01)
*G06F 9/44* (2006.01)

(52) U.S. Cl.
CPC ............ *G06F 3/0482* (2013.01); *G06F 9/4446* (2013.01); *G06F 3/0481* (2013.01); *G06F 3/04812* (2013.01)
USPC ........... 715/707; 715/706; 715/708; 715/733; 715/745; 715/767

(58) Field of Classification Search
CPC .. G06F 9/4446; G06F 3/0481; G06F 3/04812
USPC .................. 715/706, 708, 733, 767, 707, 745
See application file for complete search history.

(56) References Cited

U.S. PATENT DOCUMENTS

| | | | |
|---|---|---|---|
| 5,513,308 A * | 4/1996 | Mori ............................ | 715/707 |
| 6,388,665 B1 * | 5/2002 | Linnett et al. ................ | 345/473 |
| 7,836,401 B2 * | 11/2010 | Hathaway .................... | 715/714 |
| 8,136,038 B2 * | 3/2012 | Ross et al. .................... | 715/706 |
| 2001/0043233 A1 * | 11/2001 | Sato et al. .................... | 345/706 |
| 2003/0030668 A1 * | 2/2003 | Morrison ..................... | 345/745 |
| 2005/0138559 A1 * | 6/2005 | Santos-Gomez et al. ..... | 715/709 |
| 2006/0053372 A1 * | 3/2006 | Adkins et al. ................ | 715/709 |
| 2008/0195946 A1 * | 8/2008 | Peri-Glass ................... | 715/715 |
| 2009/0083665 A1 * | 3/2009 | Anttila et al. ................ | 715/834 |
| 2012/0206577 A1 * | 8/2012 | Guckenberger et al. ...... | 348/47 |

\* cited by examiner

*Primary Examiner* — Ting Lee
(74) *Attorney, Agent, or Firm* — Morgan, Lewis & Bockius LLP

(57) ABSTRACT

An electronic device with one or more processors and memory provides a user interface for presentation to a user including a plurality user interface objects corresponding to functions of an online application. The device determines whether to superimpose a portion of the informative materials on the user interface. In accordance with a determination that the portion of the informative materials is to be superimposed on the user interface, the device provides the portion of the informative materials for presentation to the user, including: media content overlaid on the user interface; and a focus indicator overlaid on the user interface that is configured to draw the respective user's attention to one or more user interface objects of the user interface in coordination with the media content. The device responds to user interaction with a user interface objects by performing a corresponding function of the online application.

23 Claims, 16 Drawing Sheets

SYSTEM AND METHOD FOR SUPERIMPOSING A CONTEXT-SENSITIVE VIRTUAL AGENT ON A WEB-BASED USER INTERFACE

RELATED APPLICATIONS

This application claims priority to U.S. Provisional Patent Application No. 61/845,274, filed Jul. 11, 2013, which is hereby incorporated by reference in its entirety.

TECHNICAL FIELD

The disclosed embodiments relate generally to providing media content and, more particularly, to superimposing coordinated informative materials on a web-based user interface.

BACKGROUND

As cloud computing has improved and become ubiquitous, users are increasingly able to use web-based applications in place of native software stored on the users' computing device. For example, users can access applications (or, more generally, software) via the Internet on a variety of computer based electronic devices. In addition, advances in network technology have increased the speed and reliability with which web-based software can be accessed.

SUMMARY

Despite advances in the provision of web-based applications, some solutions for providing supplemental media content are neither context sensitive nor coordinated with the user interface of the web-based application. Accordingly, there is a need for a method that humanizes the user interface experience on a contextual basis. Such methods and interfaces enhance the user experience as the user is able to consume relevant informative materials. For example, a first-time user of a user interface for a web-based application (e.g., a sales portal) is presented with informative materials (e.g., a virtual agent presenting a tutorial with a coordinated focus indicator) indicating the functions and tools of the web-based application, which are superimposed on the user interface of the web-based application.

In accordance with some embodiments, a method of superimposing coordinated informative materials on a web-based user interface is disclosed. The method is performed at an electronic device with one or more processors and memory. The electronic device provides the user interface for presentation to a respective user, the user interface includes a plurality of displayed user interface objects for initiating performance of corresponding functions of an online application. The electronic device determines whether to superimpose a respective portion of the informative materials on the user interface, where the informative materials are distinct from the user interface. In accordance with a determination that the respective portion of the informative materials is to be superimposed on the user interface, the electronic device provides the respective portion of the informative materials for presentation to the respective user, including: providing media content for presentation to the respective user, where the media content is overlaid on the user interface; and providing a focus indicator for presentation to the respective user, where the focus indicator is configured to draw the respective user's attention to one or more user interface objects of the user interface in coordination with the media content, and where the focus indicator is overlaid on the user interface. The respective portion of the informative materials comprises the media content and focus indicator provided for presentation to the user. The electronic device responds to user interaction with any of the plurality of displayed user interface objects by performing corresponding functions of the online application.

In some embodiments, a computer system (e.g., a user device or server system) includes one or more processors and memory storing one or more programs for execution by the one or more processors, the one or more programs include instructions for performing the operations of the methods described herein. In some embodiments, a non-transitory computer readable storage medium storing one or more programs, the one or more programs comprising instructions, which, when executed by a portable electronic device or computer system with one or more processors (e.g., a user device or server system), cause the device or system to perform the operations of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
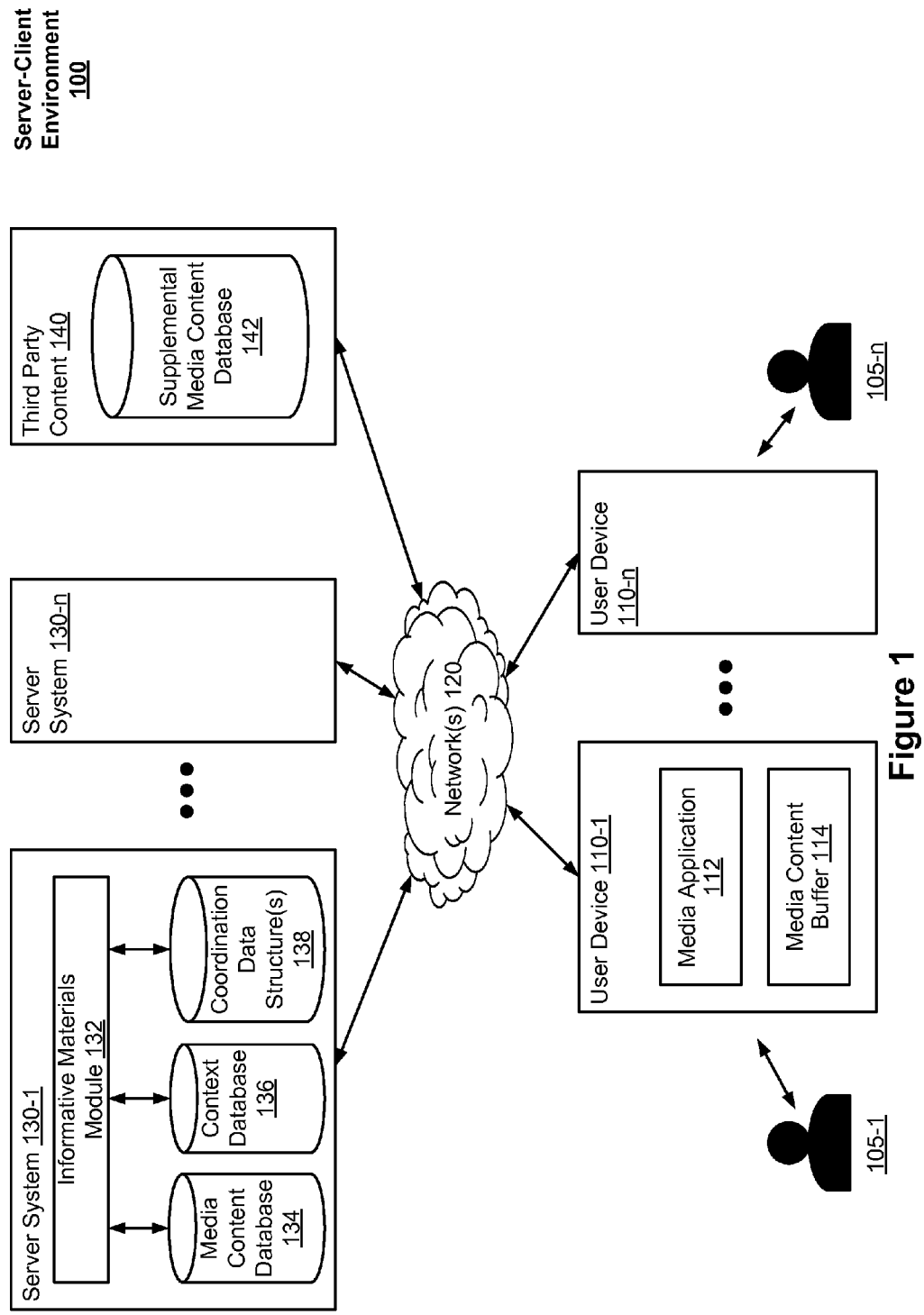
FIG. 1 is a block diagram illustrating a server-client environment in accordance with some embodiments.
Figure 2A:
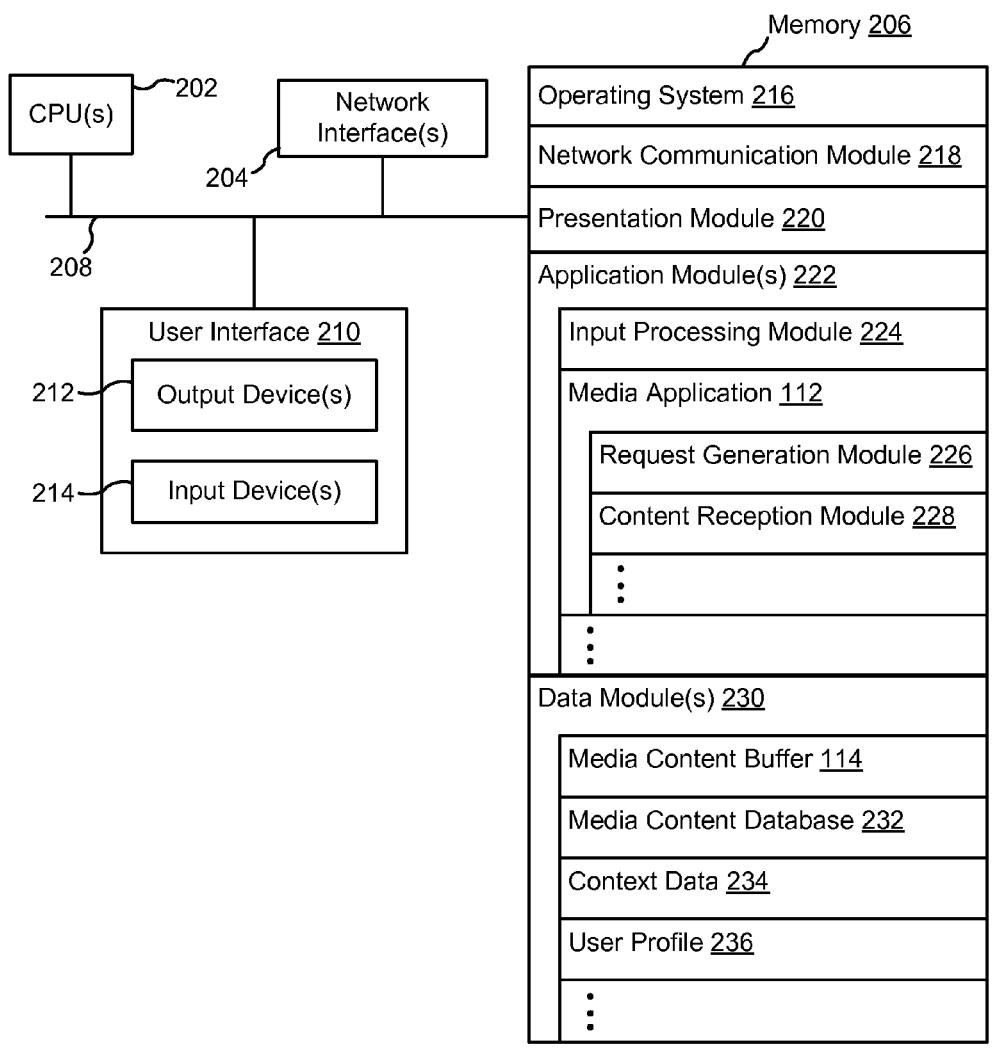
FIG. 2A is a block diagram illustrating a user device in accordance with some embodiments.
Figure 2B:
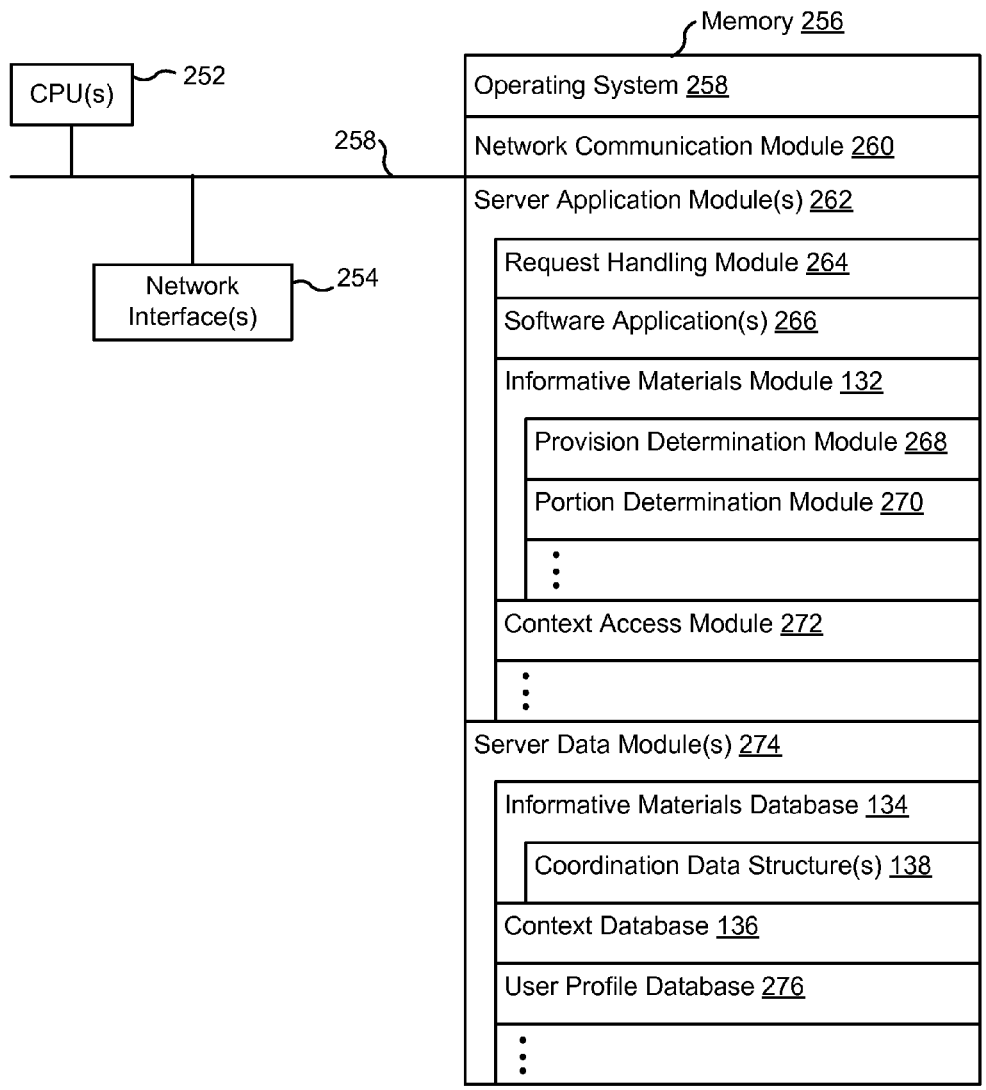
FIG. 2B is a block diagram illustrating a server system in accordance with some embodiments.
Figure 4:
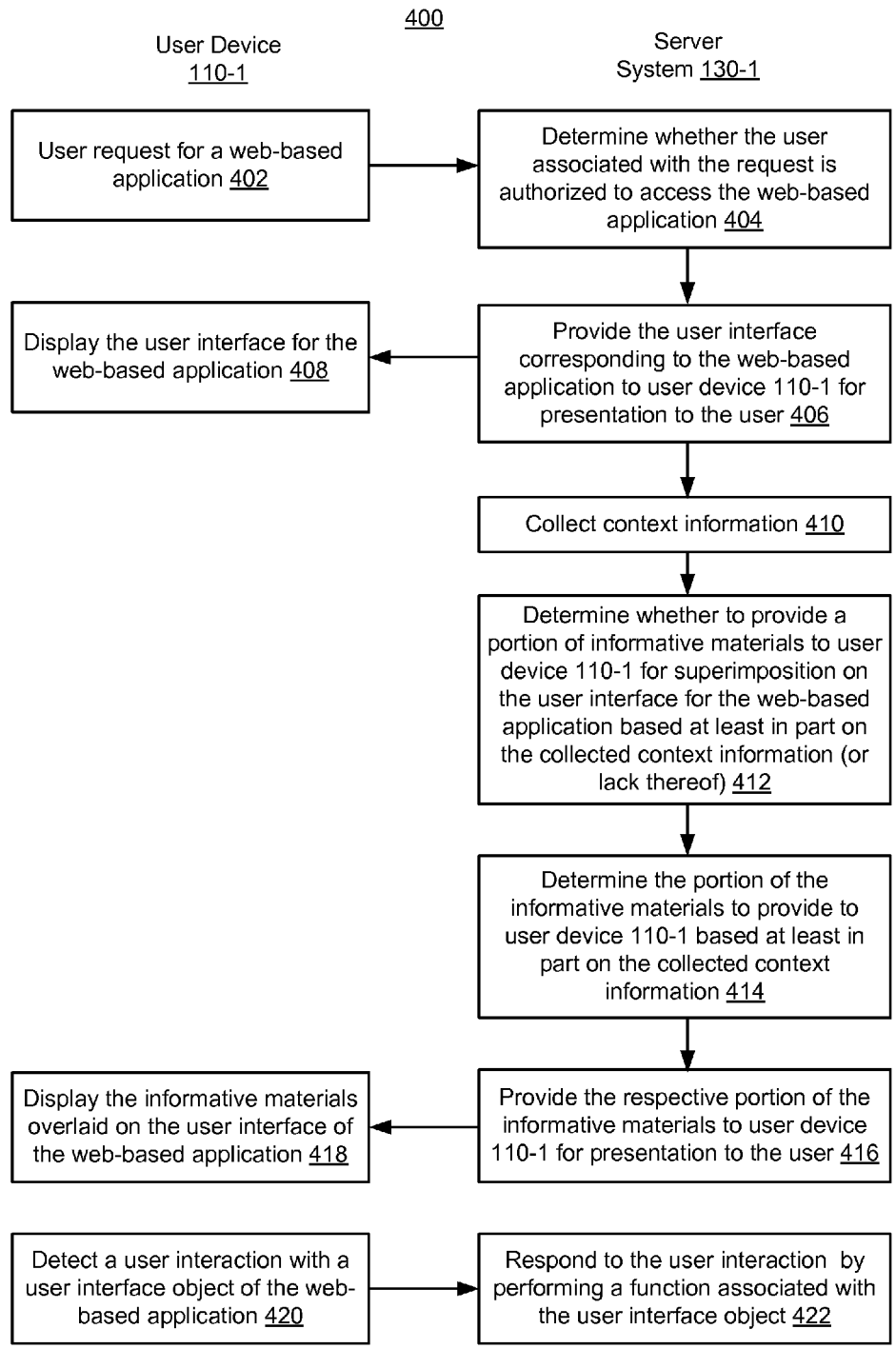
FIG. 4 is a flow diagram illustrating a method of superimposing coordinated informative materials on a web-based user interface in accordance with some embodiments.
Figure 5A:
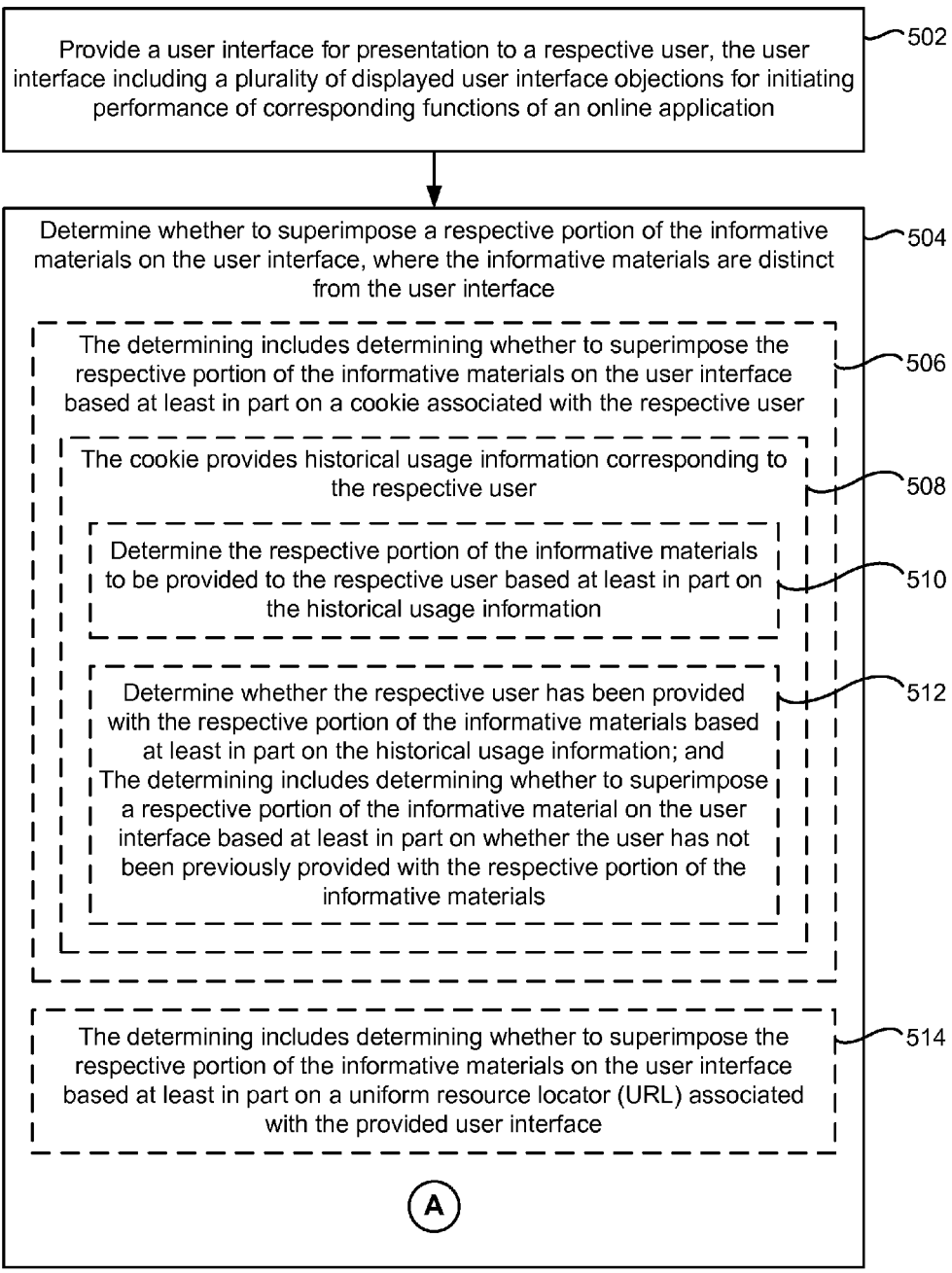
FIGS. 5A-5C are flow diagrams illustrating a method of superimposing coordinated informative materials on a web-based user interface in accordance with some embodiments.
Figure 5B:
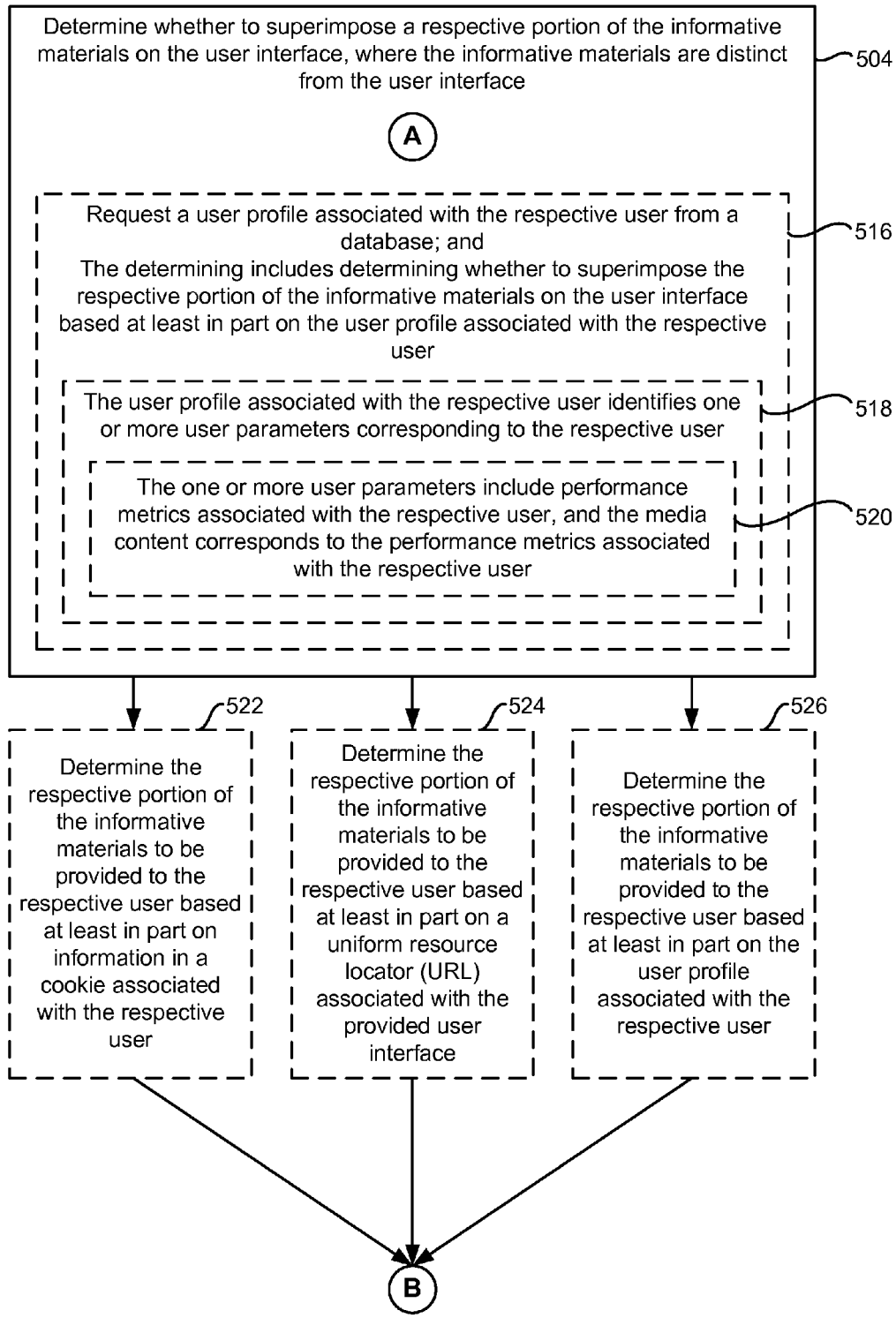
Figure 5C:
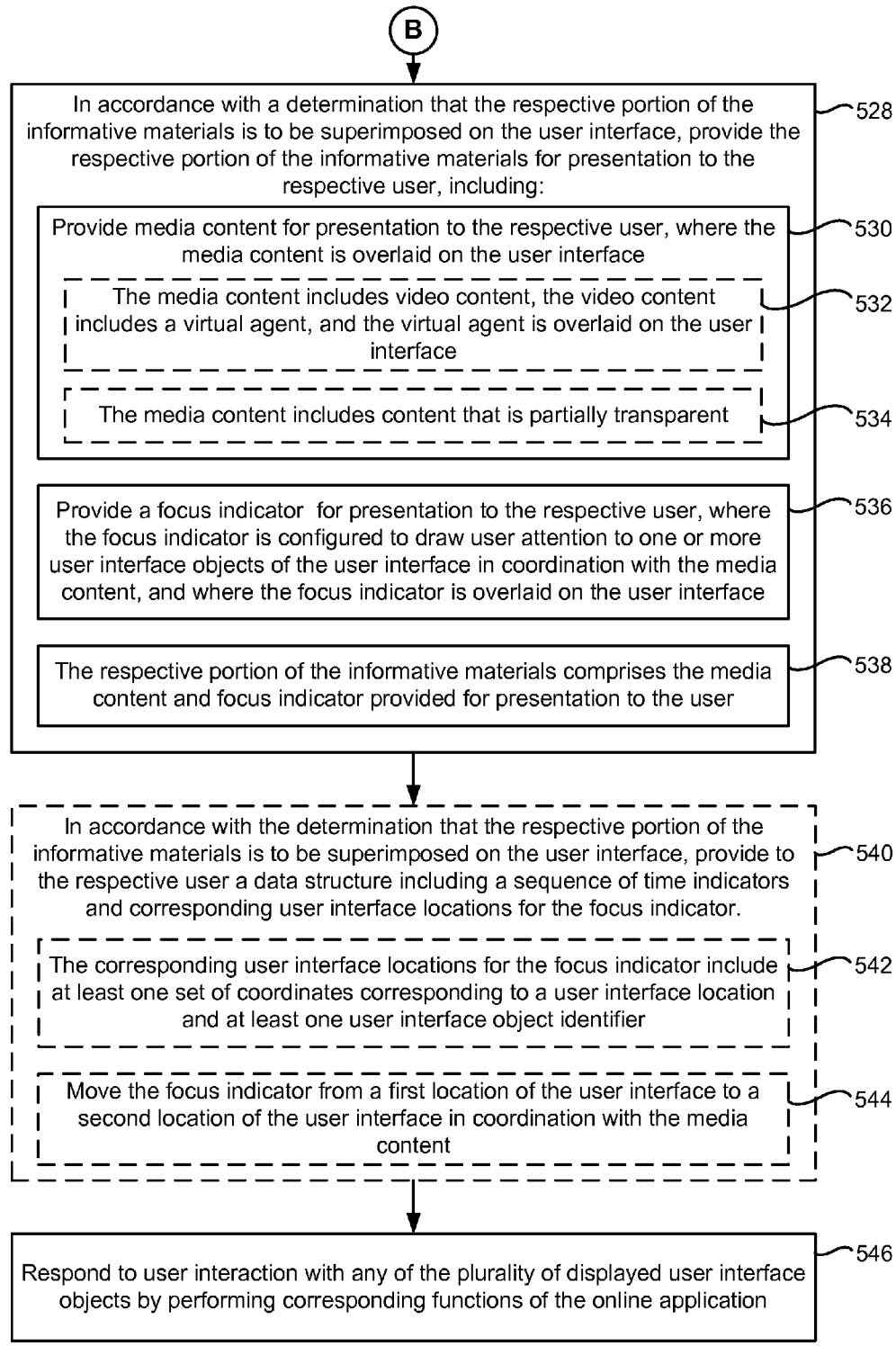

Below, FIG. 1 provides a description of an exemplary server-client environment. FIGS. 2A-2B provide descriptions of an exemplary user device and an exemplary server system, respectively, within the server-client environment. FIGS. 3A-3I illustrate exemplary user interfaces for superimposing coordinated informative materials on a web-based user interface. FIG. 4 is a flow diagram illustrating a method of superimposing coordinated informative materials on a web-based user interface. FIGS. 5A-5C are flow diagrams illustrating a method of superimposing coordinated informative materials on a web-based user interface. The user interfaces in FIGS. 3A-3I are used to illustrate the processes in FIGS. 4 and 5A-5C.

Exemplary Server-Client Environment

FIG. 1 is a block diagram of a server-client environment 100 in accordance with some implementations. Server-client environment 100 includes one or more user devices (110-1, . . . , 110-n), one or more server systems (130-1, . . . , 130-n), and third party content 140 connected through one or more networks 120. User devices 110 are sometimes herein called client devices, or simply devices.

In some embodiments, user device 110-1 is a representative electronic device associated with a respective user 105-1. In some embodiments, server system 130-1 is a representative server associated with a web-based software provider with which users (and their electronic devices), or a plurality of users from a same entity (e.g., all or a portion of employees from a company) have accounts that enable the users of user devices 110 to access web-based applications. Third party content 140 includes supplemental media content database 142 separate and/or remote from user devices 110 and server systems 130. One or more networks 120 include the Internet, other Wide Area Networks (WANs), Local Area Networks (LANs), Personal Area Networks, metropolitan area networks, Virtual Private Networks (VPNs), local peer-to-peer and/or ad-hoc connections, and so on.

In some embodiments, user device 110-1 is one of the group of: a wearable computing device, a personal computer, a portable electronic device, a laptop computer, a tablet computer, a mobile phone, a digital media player, or any other electronic device able to present media content and/or web pages.

In some embodiments, user device 110-1 or the corresponding user (e.g., user 105-1) is associated with a user account (e.g., login credentials including a user name and password) provided by a web-based software provider with which server system 130-1 is associated. For example, in some implementations, server system 130-1 is operated and/or provided by a subscription-based web-based software provider (e.g., a software-as-a-service provider) or cloud computing service to which a user, optionally, has an account. Furthermore, in some embodiments, the login credentials enable user device 110-1 or user 105-1 to communicate with and access content from server system 130-1.

In some embodiments, user device 110-1 includes a media content presentation and control application 112 (hereinafter "media application 112"). Media application 112 is able to control the presentation of media content by user device 110-1. For example, media application 112 is a media player or web browser that enables a user to navigate and select media content items for playback on user device 110-1 in addition to accessing web pages and web-based applications. The term "web-based application" is used herein to mean software that is hosted by a server system and that is accessed or invoked by client system users via web pages rendered by a web browser application, or that is accessed or invoked by client system users using other client applications.

In some embodiments, media content is stored by user device 110-1. In some other embodiments, media content is stored by server system 130-1, which is located remotely from user device 110-1. In some other embodiments, media content is stored by third party content 140 in supplemental media content database 142 and accessed by server system 130-1 for provision to user device 110-1. In turn, media content, web pages, or web-based applications or software are transmitted from server system 130-1 to user device 110-1 over one or more networks 120.

In some embodiments, at least a portion of the data transmitted from server system 130-1 to user device 110-1 is stored/cached by user device 110-1 in media content buffer 114 in the memory of user device 110-1. In some embodiments, media content stored in media content buffer 114 is removed after the media content is presented by user device 110-1, allowing new media content data to be stored in content buffer 114. In some other embodiments, at least some of the media content stored in media content buffer 114 is retained for a predetermined amount of time after the content is presented by user device 110-1 and/or until other predetermined conditions are satisfied.

In some embodiments, server system 130-1 includes an informative materials module 132 for providing informative materials (e.g., media content and a focus indicator) for superimposition on the user interface of a web-based application. In some embodiments, informative materials module 132 is enabled to access a media content database 134, a context database 136, and one or more coordination data structures 138.

Media content database 134 stores informative materials and metadata describing the informative materials that can be presented by user device 110-1. For example, in some implementations, media content database 134 stores informative materials such as video content (e.g., video tutorials), audio content, images (e.g., charts, graphs, graphics, photographs, etc.), text and/or other media content that can be transmitted to user device 110-1 for superimposition on the user interface of the web-based application.

Context database 136 stores context information corresponding to the users of user devices 110. In some embodiments, a cookie associated with a web-based application of server system 130-1 is located at user device 110-1 of a respective user (e.g., stored in a web browser cache or context data 234). For example, upon login of the respective user to the web-based application, information in the cookie (or gathered by the cookie) is accessed by server system 130-1 and stored in context database 136. The cookie information includes historical usage information indicating the user's usage of the web-based application (e.g., time and date stamps of logins, a counter of logins), a user log of interactions with the web-based application (e.g., a log of media content provided and/or viewed by the user and a log of click or selection events), user preferences, and other information. In some other embodiments, context database 136 includes a data structure correlating uniform resource locators (URLs) corresponding to web pages associated with the web-based application with informative materials. For example, different informative materials are provided to a user depending on the current URL being accessed by the user.

In some embodiments, informative materials include media content and a focus indicator configured to draw the user's attention to one or more user interface elements of the web-based application in coordination with the media content. One or more coordination data structures 138 enable coordination of the media content and the focus indicator. In some implementations, a respective data structure of the coordination data structures 138 includes a sequence of time indicators and corresponding user interface locations for the focus indicator.

In some embodiments, the server-client environment includes third party content 140, which includes a supplemental media content database 142 accessible to server systems 130 over one or more networks 120. For example, third party content 140 is hosted by a party different from the web-based software provider associated with server system 130-1 (e.g., by the company subscribing to web-based software provider's services) and is accessible via the Internet. For example, the company subscribing to web-based software provider's services generates the informative materials to suit the needs of the company and its users or employees, and stores the informative materials in database 142. In some embodiments, the informative materials include media content (e.g., video content, images, etc.), a focus selector, and a data structure for coordinating the focus selector with the media content.

FIG. 2A is a block diagram illustrating a representative user device 110-1 associated with user 105-1 in accordance with some embodiments. User device 110-1 typically includes one or more processing units (CPUs) 202, one or more network interfaces 204, memory 206, and one or more communication buses 208 for interconnecting these components (sometimes called a chipset). User device 110-1 also includes a user interface 210. User interface 210 includes one or more output devices 212 that enable presentation of media content, including one or more speakers and/or one or more visual displays (e.g., touch screen 215). User interface 210 also includes one or more input devices 214, including user interface components that facilitate user input such as a keyboard, a mouse, a voice-command input unit or microphone, a touch sensitive display (e.g., touch screen 215), a touch-sensitive input pad, a gesture capturing camera, or other input buttons or controls. Furthermore, some user devices 110 use a microphone and voice recognition or a camera and gesture recognition to supplement or replace the keyboard. Memory 206 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 206, optionally, includes one or more storage devices remotely located from CPU(s) 202. Memory 206, or alternately the non-volatile memory device(s) within memory 206, includes a non-transitory computer readable storage medium. In some implementations, memory 206 or the non-transitory computer readable storage medium of memory 206 stores the following programs, modules, and data structures, or a subset or superset thereof:

- an operating system 216 including procedures for handling various basic system services and for performing hardware dependent tasks;
- a network communication module 218 for connecting user device 110-1 to other computers (e.g., server systems 130) connected to one or more networks 120 via one or more communication network interfaces 204 (wired or wireless);
- a presentation module 220 for enabling presentation of informative materials (e.g., media content and a focus indicator) and a user interface for web pages or a web-based applications at user device 110-1 via one or more output devices 212 (e.g., displays, speakers, etc.) associated with user interface 210;
- one or more application modules 222 for enabling user device 110-1 to perform corresponding functions, including but not limited to:
  - an input processing module 224 for receiving one or more user inputs from one of the one or more input devices 214 and interpreting the received input; and
  - a media application 112 (e.g., a web browser or media player) for requesting and accessing media content, web pages, and web-based applications, media application 112 including:
    - a request generation module 226 for generating a request for media content, a web page, or a web-based application in accordance with the input received from the input processing module 224; and
    - a content reception module 228 for receiving content (e.g., informative materials, a web page, or a user interface for a web-based application) from one or more server systems 130;
- one or more data modules 230 for storing data related to user device 110-1, including but not limited to:
  - a media content buffer 114 for temporarily storing content (e.g., informative materials) received from server systems 130;
  - a media content database 232 for storing received content as part of the user's personal library of media content; and
  - context data 234 (e.g., a web browser cache) including context information (e.g., a cookie with historical usage information) associated with the user of user device 110-1, for example, information indicating the user's usage of the web-based application (e.g., time and date stamps of logins and a counter of logins), a user log of interactions with the web-based application (e.g., a log of media content provided and/or viewed by the user and a log of click or selection events), user preferences, and other information; and
  - a user profile 236 including context information associated with the user of user device 110-1 that, for example, indicates the user's usage of the web-based application (e.g., time and date stamps of logins and a counter of logins), a user log of interactions with the web-based application (e.g., a log of media content provided and/or viewed by the user and a log of click or selection events), user preferences, and other information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

FIG. 2B is a block diagram illustrating a respective server system 130-1 in accordance with some embodiments. Server system 130-1 typically includes one or more processing units (CPUs) 252, one or more network interfaces 254, memory 256, and one or more communication buses 258 for interconnecting these components (sometimes called a chipset). Memory 256 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 256, optionally, includes one or more storage devices remotely located from the CPU(s) 252. Memory 256, or alternately the non-volatile memory device(s) within memory 256, includes a non-transitory computer readable storage medium. In some implementations, memory 256 or the non-transitory computer readable storage medium of memory 256 stores the following programs, modules, and data structures, or a subset or superset hereof:

- an operating system 258 including procedures for handling various basic system services and for performing hardware dependent tasks;
- a network communication module 260 that is used for connecting server system 130-1 to other computers (e.g., user devices 110) connected to one or more communication networks 120 via one or more network interfaces 254 (wired or wireless);

one or more server application modules 262 for enabling server system 130-1 to perform corresponding functions, including but not limited to:
- a request handling module 264 for receiving requests from user devices 110, including requests to login to or access services provided by server system 130-1;
- one or more software applications 266 (e.g., a web-based application or software) enabling a user (e.g., an authorized user with a subscription to the one or more software applications) to utilize corresponding services, functions, tools, or media content;
- an informative materials module 132 for providing informative materials (e.g., media content and a focus indicator) to a user, informative materials module 132 including:
  - a provision determination module 268 for determining whether to provide informative materials to respective user device 110-1 in response to a request for media content, a web page, or a web-based application; and
  - a portion determination module 270 for determining a portion of the informative to provide to respective user device 110-1 in response to the request for the media content, the web page, or the web-based application;
- a context access module 272 for accessing context information associated with the users of user devices 110; and one or more server data modules 274 for storing data related to server system 130-1, including but not limited to:
- media content database 134 for storing informative materials and metadata describing the informative materials, media content database 134 including:
  - one or more coordination data structures 138 (e.g., XML files) for coordinating informative materials with a user interface of the web-based application;
- a context database 136 for storing context information for a plurality of users corresponding to user devices 110; and
- a user profile database 274 for storing context information for a plurality of users, where the context information for a respective user, optionally, includes the user's usage of the web-based application (e.g., time and date stamps of logins and a counter of logins), a user log of interactions with the web-based application (e.g., a log of media content provided and/or viewed by the user and a log of click or selection events), user preferences, and other information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 256, optionally, stores a subset of the modules and data structures identified above. Furthermore, memory 256, optionally, stores additional modules and data structures not described above.

Although FIG. 2B shows server system 130-1, FIG. 2B is intended more as functional description of the various features which may be present in a set of servers than as a structural schematic of the implementations described herein. In practice, and as recognized by those of ordinary skill in the art, items shown separately could be combined and some items could be separated. For example, some items shown separately in FIG. 2B could be implemented on a single server and single items could be implemented by one or more servers. The actual number of servers used to implement server system 130-1 and how features are allocated among them will vary from one implementation to another.

Although some of the examples which follow will be given with reference to inputs on touch screen display 215, where a touch sensitive surface (input device) and a display (output device) are combined, in some other embodiments, user device 110-1 detects inputs on a touch-sensitive surface that is separate from the display. In accordance with these embodiments, the device detects contacts with the touch-sensitive surface at locations that correspond to respective locations on the display. In this way, user inputs (e.g., contacts and movements thereof) detected by user device 110-1 on the touch-sensitive surface are used by device 110-1 to manipulate the user interface on the display of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or stylus input). For example, a tap gesture is, optionally, replaced with a mouse click while the cursor is located over the location of the tap gesture (e.g., instead of detection of the contact followed by ceasing to detect the contact).

User Interfaces and Associated Processes

Attention is now directed towards embodiments of user interfaces ("UI") and associated processes that may be implemented on a respective user device 110-1 with a touch screen display 215. Touch screen display 215 is configured to receive one or more contacts and display information (e.g., media content, web pages and/or a user interface for a web-based application).

FIGS. 3A-3I illustrate exemplary user interfaces for superimposing coordinated informative materials on a user interface for a web-based application in accordance with some embodiments. The user interfaces in these figures are used to illustrate the processes described below, including the processes in FIGS. 4 and 5A-5C.

Figure 3A:
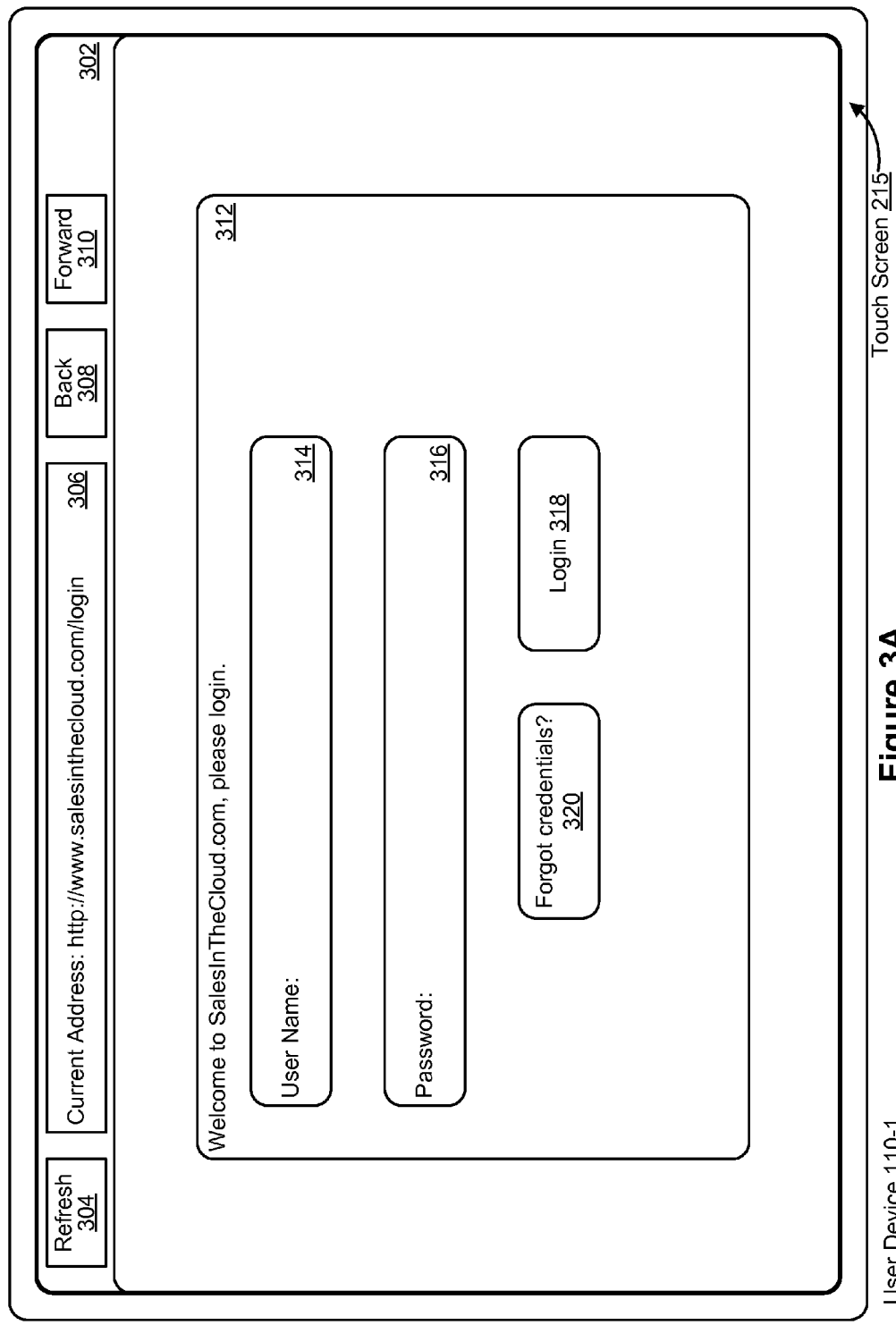
FIGS. 3A-3I illustrate exemplary user interfaces for superimposing coordinated informative materials on a web-based user interface in accordance with some embodiments.

FIG. 3A illustrates user device 110-1 displaying a login screen for a web-based application on a touch screen 215. In FIG. 3A, the web-based application is presented in a web browser 302 that is used to navigate to and access the web-based application. For example, prior to displaying the login screen, the user of user device 110-1 navigated to the login screen by entering a uniform resource locator (URL) (e.g., http://www.salesinthecloud.com/login) corresponding to the login screen for the web-based application into address bar 306 of web browser 302. In FIG. 3A, device 110-1 displays other controls for web browser 302 including a refresh button 304, a back button 308, and a forward button 310. In some embodiments, user interface objects or elements displayed on touch screen 215 are also referred to as buttons or affordances that, when activated, cause user device 110-1 (or web browser 302) to perform a corresponding function. For example, in response to activation of back button 308, web browser 302 loads and subsequently presents the last visited web page.

FIG. 3A also illustrates user device 110-1 displaying login dialogue box 312 for the web-based application (e.g., a sales portal) on touch screen 215. For example, a user is enabled to access the web-based application provided by a web-based software provider when the user enters valid login credentials. In this example, the user or the company employing the user is provided with valid login credentials when the user or the company employing the user subscribes to the software provider's services. In FIG. 3A, login dialogue box 312 includes a user name field 314, a password field 316, a login button 318, and a "forgot credentials" button 320. Login button 318, when activated, causes user device 110-1 to send an authentication request to server system 130-1 associated with the web-based software provider of the web-based application. In response to the authentication request and in accordance with a determination that the entered login credentials are valid, server system 130-1 provides a landing page or dashboard (e.g., a web page comprising a user interface) for the web-based application to user device 110-1. In some embodiments, server system 130-1 also provides (in some cases) informative materials corresponding to the web-based application to user device 110-1.

Figure 3B:
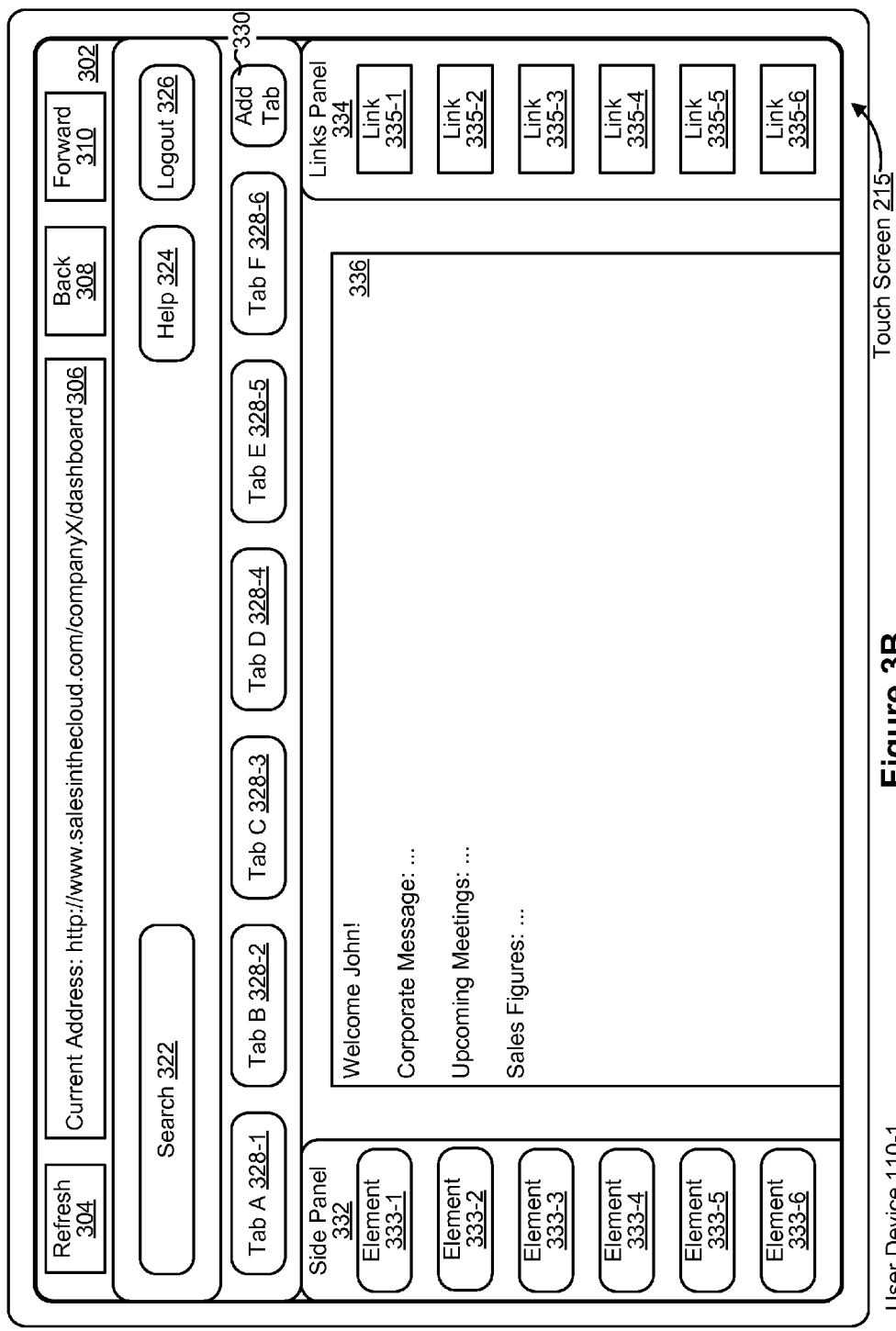

FIG. 3B illustrates user device 110-1 displaying a landing page or dashboard (e.g., comprising a user interface) for a web-based application in web browser 302 on touch screen 215 in response to the entrance of valid login credentials in FIG. 3A. In some embodiments, an individual or company that subscribes to the services (e.g., web-based applications or software) of a web-based software provider is enabled (e.g., via a hyper-text markup language (HTML) editor provided by the web-based software provider) to create a proprietary landing page or dashboard and other pages suited to the needs of the individual or company. In FIG. 3B, address bar 306 of web browser 302 indicates that the URL for the landing page or dashboard is http://www.salesinthecloud.com/companyX/dashboard. Thus, as indicated by the URL, the landing page or dashboard displayed on touch screen 215 is a proprietary landing page or dashboard corresponding to company X.

FIG. 3B also illustrates user device 110-1 displaying a plurality of user interface objects or elements associated with the proprietary landing page or dashboard corresponding to company X on touch screen 215. The plurality of user interface objects or elements are enabled to perform functions of the web-based application. In FIG. 3B, the plurality of user interface objects or elements include a search field 322, which, when activated, causes web browser 302 to search the contents of the web-based application (or the Internet) in accordance with an entered search query, a help button 324, which, when activated, causes web browser 302 to show a help dialogue, and a logout button 326, which, when activated causes web browser 302 to logout from the web-based application. In FIG. 3B, the plurality of user interface objects or elements also include a plurality of tabs 328, which, when activated, causes web browser 302 to show a corresponding service or function different from the proprietary landing page or dashboard and an add tab button 330, which, when activated, causes web browser 302 to enable a user to add (and, optionally, remove) tabs from the proprietary landing page or dashboard. In FIG. 3B, the plurality of user interface objects or elements further include a side panel 332 with a plurality of elements 333, a links panel 334 with a plurality of links 335, and dialogue box 336 with news and information related to the respective user and/or the company employing the respective user (e.g., company X).

Figure 3C:
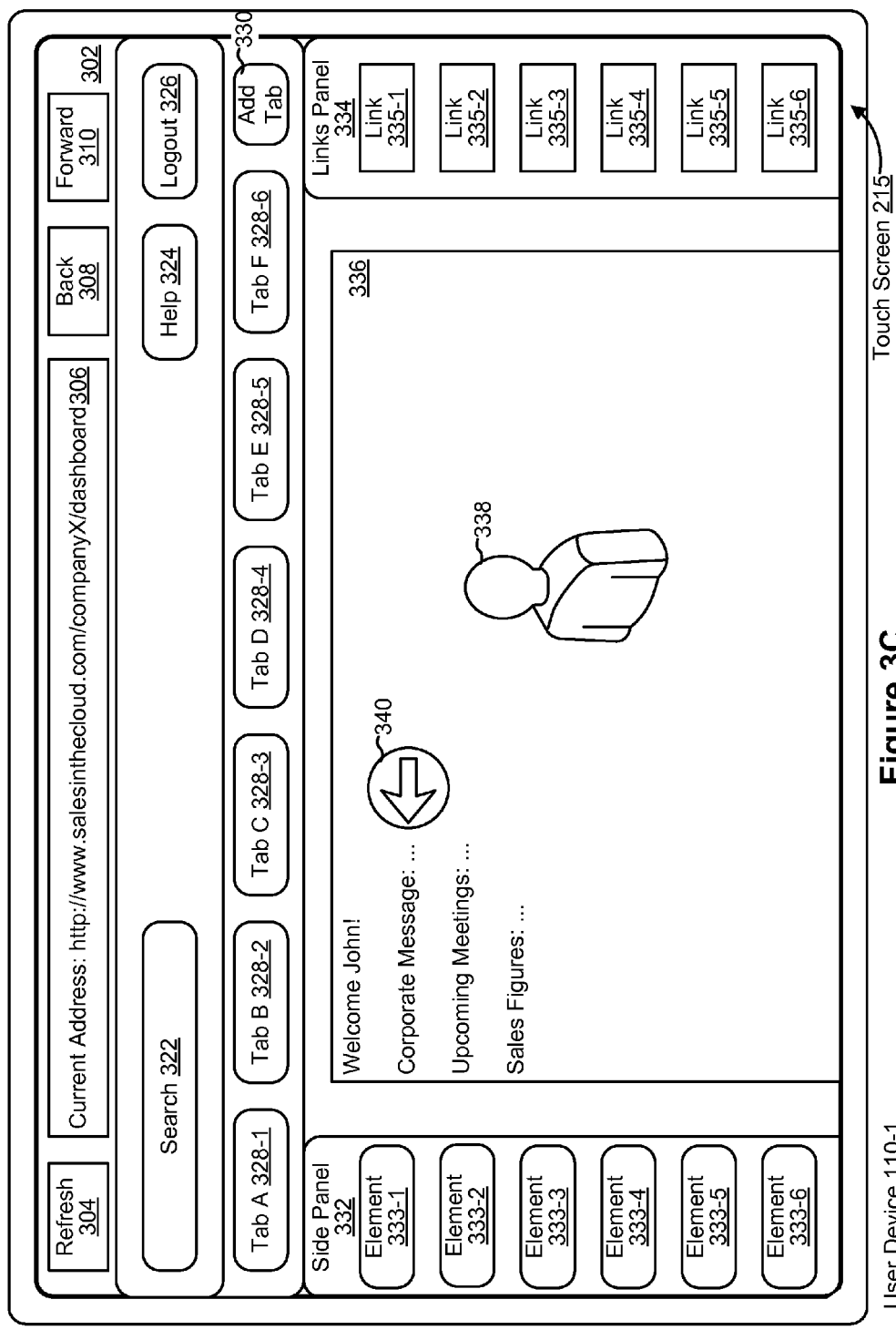

FIG. 3C illustrates user device 110-1 displaying informative materials overlaid on the proprietary landing page or dashboard (e.g., comprising a user interface) corresponding to company X on touch screen 215. In some embodiments, the individual or company that subscribes to the services (e.g., applications or software) of the web-based software provider is also enabled (e.g., via an HTML editor provided by the web-based software provider) to incorporate or implement the informative materials or media content into the web-based application. For example, the individual or company embeds a data structure such as the one explained below in Table 1 so as to implement and coordinate the informative materials into the web-based application. In FIG. 3C, the informative materials include video content including a virtual agent 338 and a focus indicator 340 coordinated with the video content. For example, the video content includes a tutorial or walkthrough for first-time users of the web-based application that describes the functions and tools provided by the web-based application. In this example, focus indicator 340 is coordinated with the video content in such a way that when virtual agent 340 points to, describes or speaks of a user interface element of the user interface, focus indicator 340 draws the first-time user's attention to the corresponding user interface element of the user interface displayed on touch screen 215 (e.g., focus indicator 340 points to the referenced user interface element). In FIG. 3C, for example, virtual agent 338 is audibly instructing the first-time user on the availability of daily corporate messages in the proprietary landing page or dashboard in the web-based application and focus indicator 340 is concurrently pointing to a respective daily corporate message shown in dialogue box 336 displayed on touch screen 215.

Figure 3D:
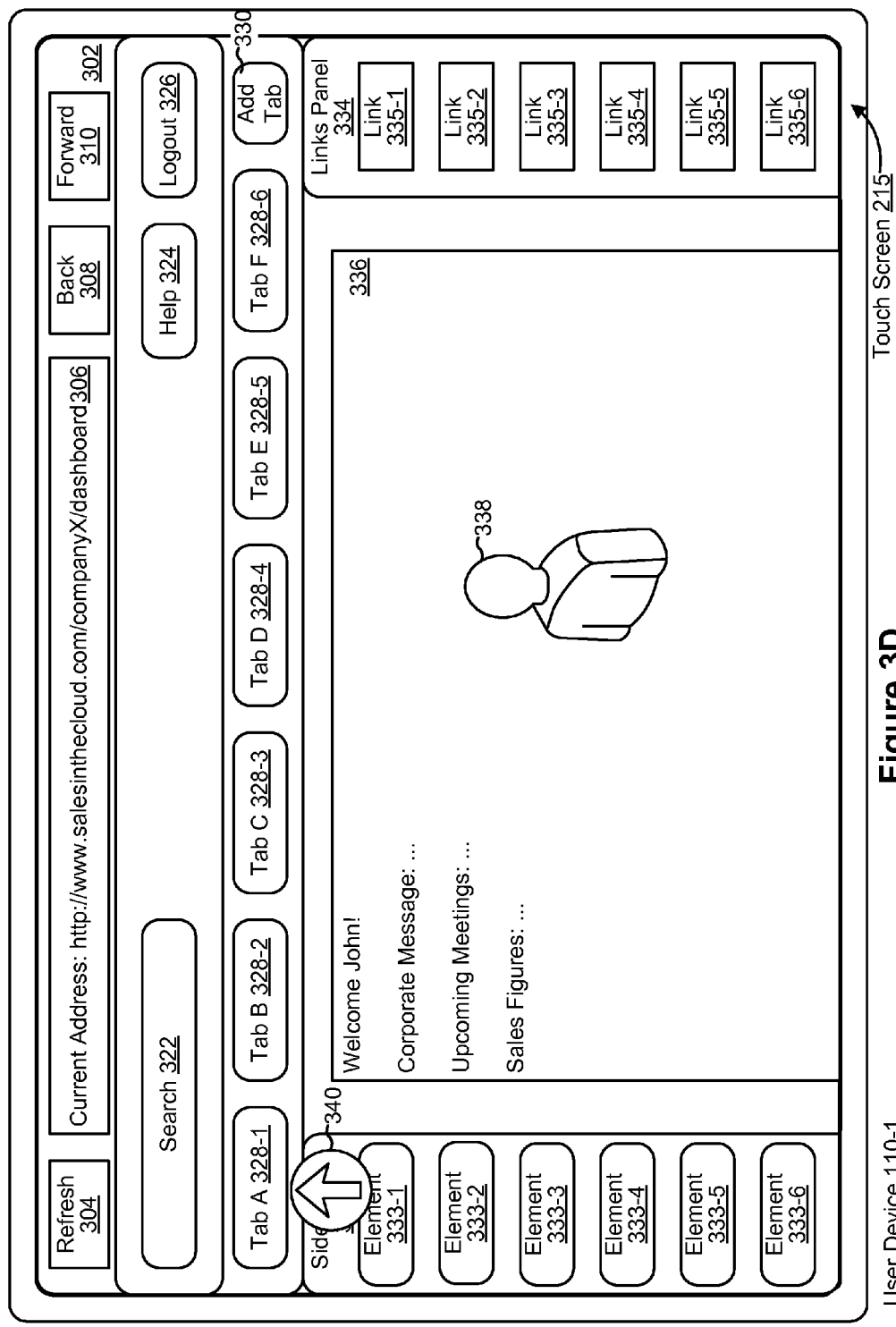

FIGS. 3C-3D illustrate movement of focus indicator 340 from a location corresponding to a daily corporate message in dialogue box 336 to a location corresponding to Tab A 328-1 associated with a related service or function. In some embodiments, the informative materials include a data structure (e.g., an XML file) including one or both of a sequence of time indicators (e.g., time stamps) and corresponding user interface locations for the focus indicator (e.g., coordinates or HTML identifiers for user interface objects or elements of the user interface). For example, the time stamps correspond to times at which the video content points to, describes or speaks of a user interface element of the user interface. Thus, the data structure enables focus indicator 340 to be coordinated with the video content such that focus indicator 340 draws the respective user's attention to one or more user interface objects in conjunction with the video content.

In FIG. 3D, focus indicator 340 has moved to a user interface location corresponding to Tab A 328-1 in conjunction with virtual agent 338 pointing to or speaking of Tab A 328-1 in accordance with the data structure. In FIG. 3D, for example, Tab A 328-1 is a button, which, when activated, causes web browser 302 to show a plurality of work documents (e.g., sales reports, expense reports, sales quotes, etc.) associated with the user of user device 110-1. In some embodiments, focus indicator 340 smoothly transitions from one position to the next and, in this example, smoothly transitions from the location shown in FIG. 3C to the location shown in FIG. 3D.

Figure 3E:
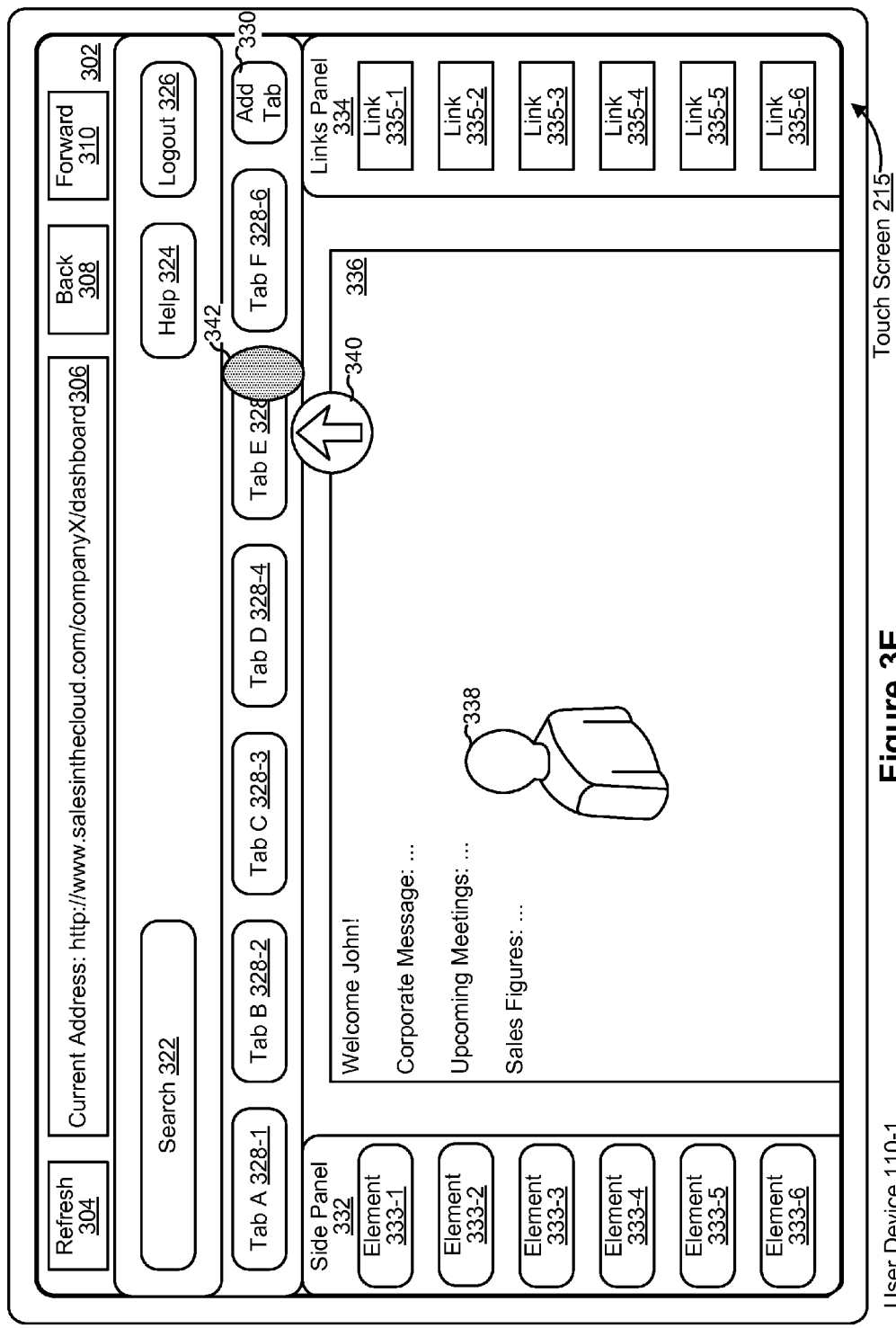

FIGS. 3D-3E illustrate movement of focus indicator 340 from a location corresponding to Tab A 328-1 associated with a related service or function to a location corresponding to Tab E 328-5 associated with a corresponding service or function different from the service or function associated with Tab A 328-1. In FIG. 3E, for example, Tab E 328-5 is a button, which, when activated, causes web browser 302 to show a plurality of professional contacts (e.g., colleagues, peers, possible sales leads, sales clients, etc.) associated with the user of user device 110-1. FIG. 3E illustrates user device 110-1 detecting contact 342 (e.g., a tap gesture) at the location corresponding to Tab E 328-5 on touch screen 215.

Figure 3F:
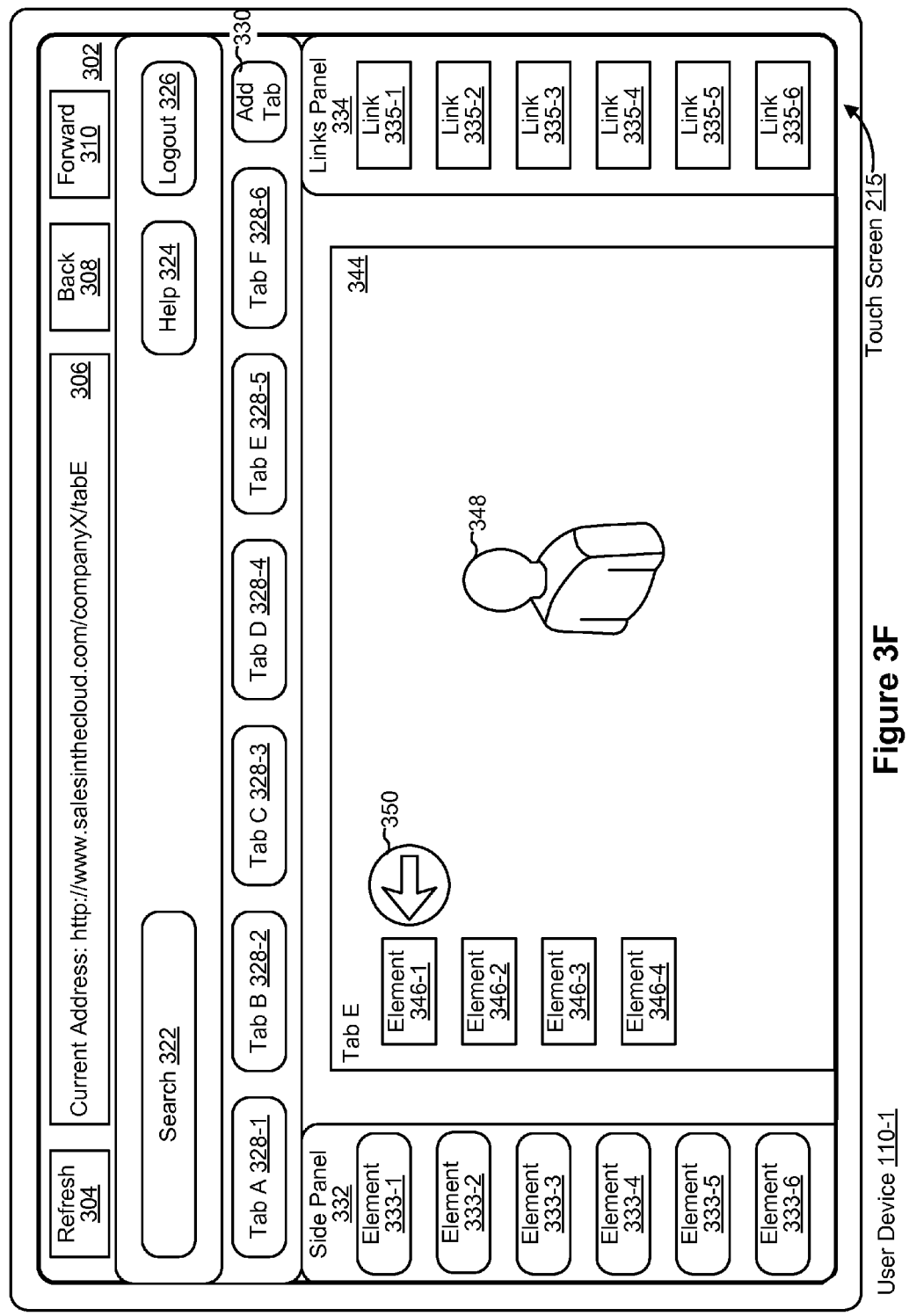

FIG. 3F illustrates user device 110-1 displaying functions or services corresponding to Tab E 328-5 on touch screen 215 in response to detecting contact 342 in FIG. 3E. In FIG. 3F, the user interface for the web-based application includes dialogue box 344 with user interface elements 346. For example, elements 346 are professional contacts associated with the user of user device 110-1, which, when activated, show contact information associated with a corresponding professional contact. FIG. 3F also illustrates user device 110-1 displaying informative materials overlaid on the user interface for the web-based application on touch screen 215. In FIG. 3F, for example, virtual agent 348 is audibly instructing the first-time user about the functionality of element 346-1 and focus indicator 350 is concurrently pointing to respective element 346-1 displayed on touch screen 215.

Figure 3G:
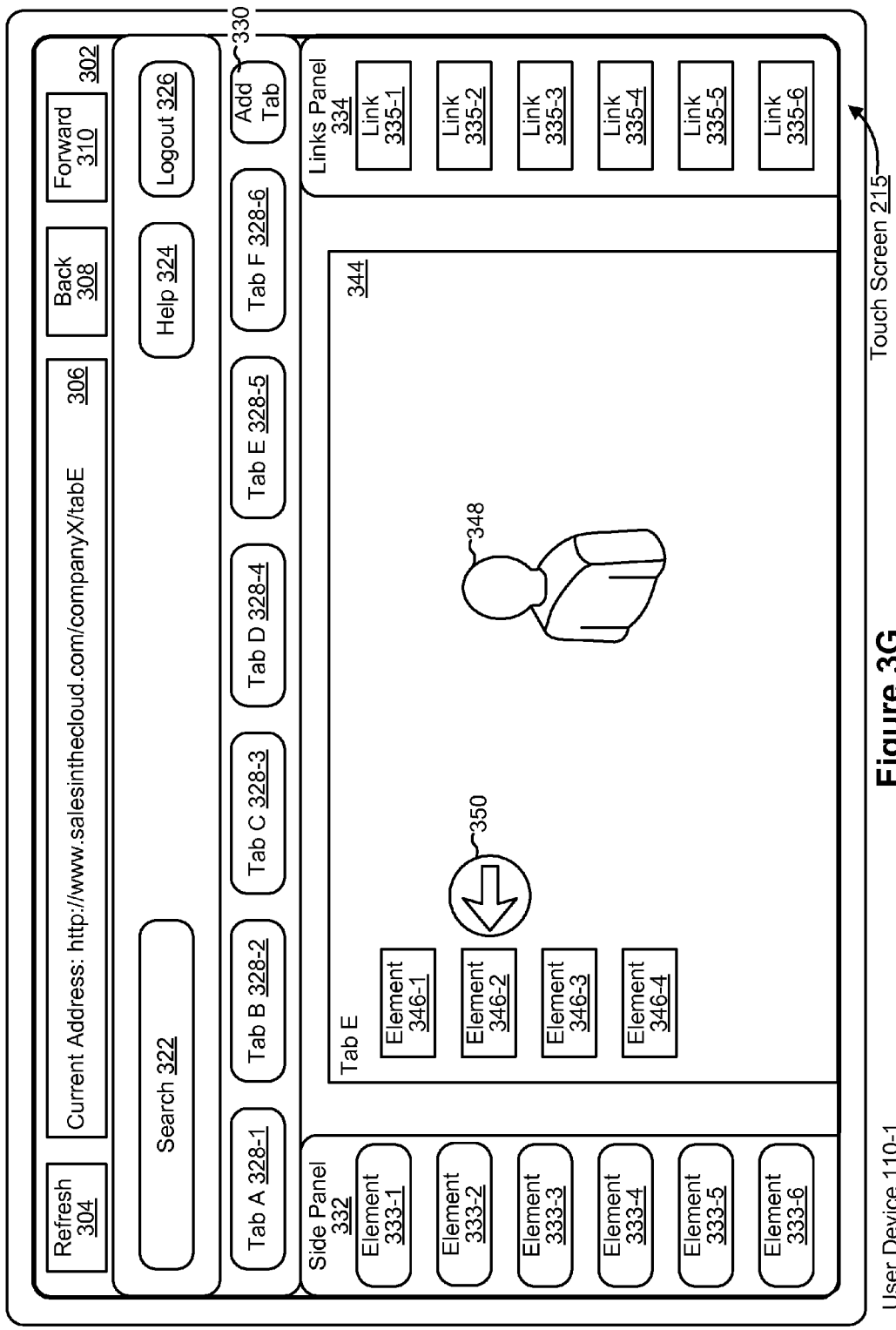

FIGS. 3F-3G illustrate movement of focus indicator 350 from a location corresponding to element 346-1 associated with a first professional contact to a location corresponding to element 346-2 associated with a second professional contact. In FIG. 3G, for example, virtual agent 348 is audibly instructing the first-time user about the functionality of element 346-2 and focus indicator 350 is concurrently pointing to respective element 346-2 displayed on touch screen 215.

Figure 3H:
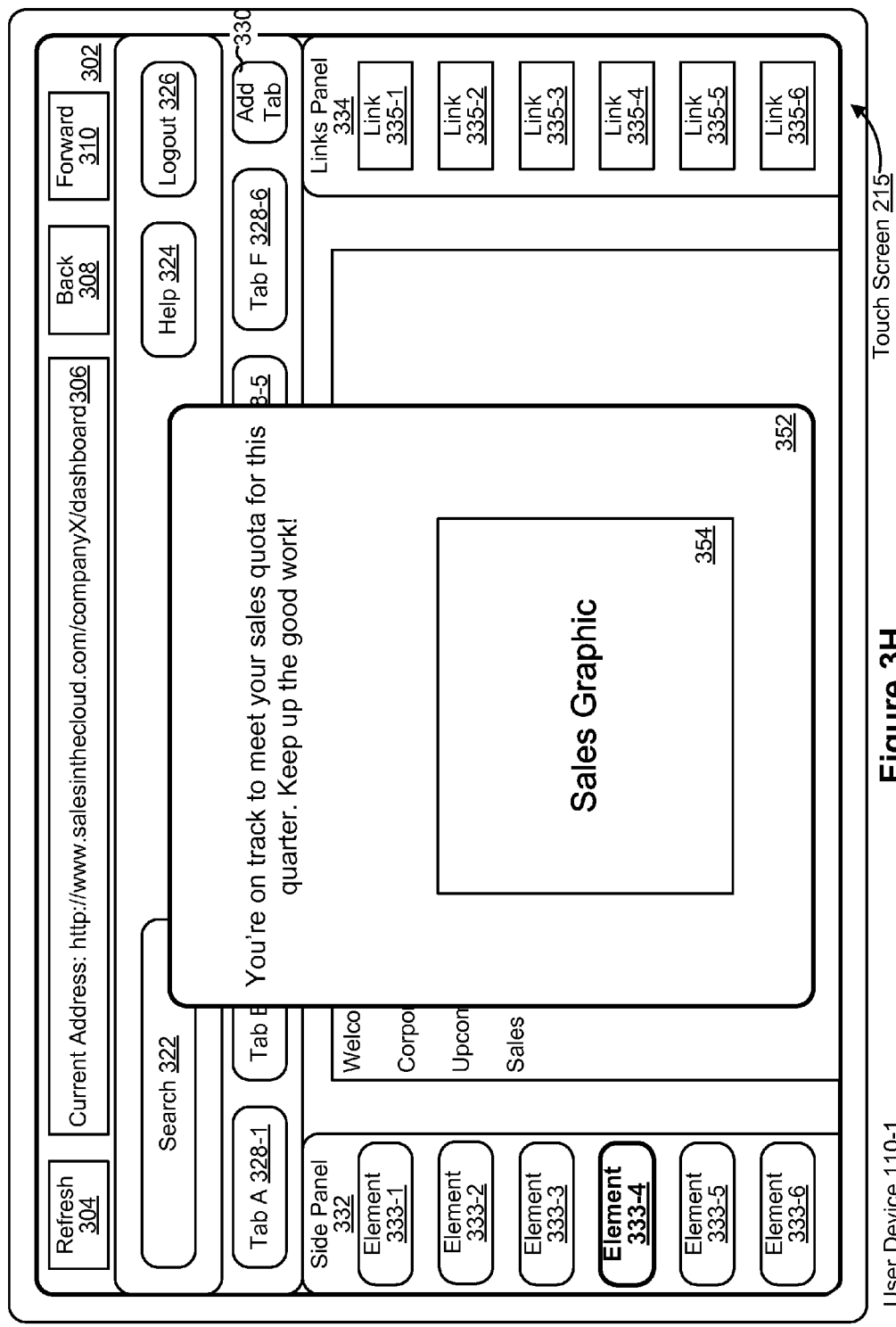

FIG. 3H illustrates user device 110-1 displaying informative materials overlaid on the proprietary landing page or dashboard (e.g., comprising a user interface) corresponding to company X on touch screen 215. In FIG. 3H, the informative materials include a pop-up message dialogue box 352 and a focus indicator configured to make element 333-4 visually distinct. For example, upon login to the web-based application, a pop-up message is overlaid on the proprietary landing page or dashboard to a non-first-time user and a focus indicator (e.g., a frame and bold text) are provided to draw the user's attention to element 333-4. For example, user interface element 333-4, when activated, causes browser 302 to show functions or statistics related to the user's sales quota. In FIG. 3H, dialogue box 352 indicates that the respective user is on track to meet his/her sales quota for the current quarter and includes a sales graphic 354 (e.g., a chart or graph with top clients or weekly sales).

In some embodiments, the focus indicator is an additional user interface object (e.g., the arrow 340 in FIG. 3C) that draws a user's attention to one or more user interface objects (e.g., a corporate message in FIG. 3C). For example, the focus indicator is an arrow, pointer, star, frame or the like that draws the user's attention to one or more user interface objects. In some other embodiments, the focus indicator changes one or more aesthetic characteristics of an existing user interface object (e.g., emboldened text, larger font size and increased line thickness of element 333-4 in FIG. 3H) to draw the user's attention to one or more user interface objects (e.g., element 333-4 in FIG. 3H). For example, a change in font, accentuation, italicization, boldness, font size, line thickness, etc. of the text or one or more user interface objects draws the user's attention to the text or one or more user interface objects.

In some embodiments, upon receiving a request to access the web-based application and determining that the user has provided valid login credentials, server system 130-1 determines whether to provide informative materials to the user of user device 110-1 and, in turn, what informative materials to provide to the user of user device 110-1 based on context information associated with the user of user device 110-1. In some embodiments, server system 130-1 makes one or both determinations based on cookie information associated with the user. In one example, server system provides a video tutorial (e.g., virtual agent 338 in FIG. 3C) for superimposition on the user interface for the web-based application in accordance with a determination that the cookie information indicates that the user is a first-time user. In another example, server system provides a pop-up dialogue box (e.g., dialogue box 352 with sales status information in FIG. 3H) for superimposition on the user interface displayed by user device 110-1 in accordance with a determination that the cookie information indicates that the user is not a first-time user.

In some other embodiments, server system 130-1 makes one or both determinations based on the URL requested by the user. For example, informative materials overlaid on the landing page or dashboard (e.g., displayed in FIGS. 3C-3E) displayed by web browser 302 are different from informative materials overlaid on functions or services corresponding to a selected tab 328-5 (e.g., displayed in FIGS. 3F-3G). Thus, the informative materials provided in FIGS. 3C-3E correspond to the landing page or dashboard, and the informative materials provided in FIGS. 3F-3G correspond to Tab E 328-5 (e.g., selected in FIG. 3E). In another example, a daily corporate message is overlaid on the landing page or dashboard, and sales graphics are overlaid on a page different from the landing page or dashboard such as a tab corresponding to sales reports.

In some other embodiments, server system 130-1 makes one or both determinations based on a user profile associated with the user. In some embodiments, the user profile includes one or more of: historical usage information indicating the user's usage of the web-based application (e.g., time and date stamps of logins and a counter of logins), a user log of interactions with the web-based application (e.g., a log of media content provided and/or viewed by the user and a log of click or selection events), user preferences, and other information. In some embodiments, the user profile is stored at server system 130-1 in user profile database 276, at user device 110-1 in user profile 236, or at an alternative database remote from both server system 130-1 and user device 110-1.

Figure 3I:
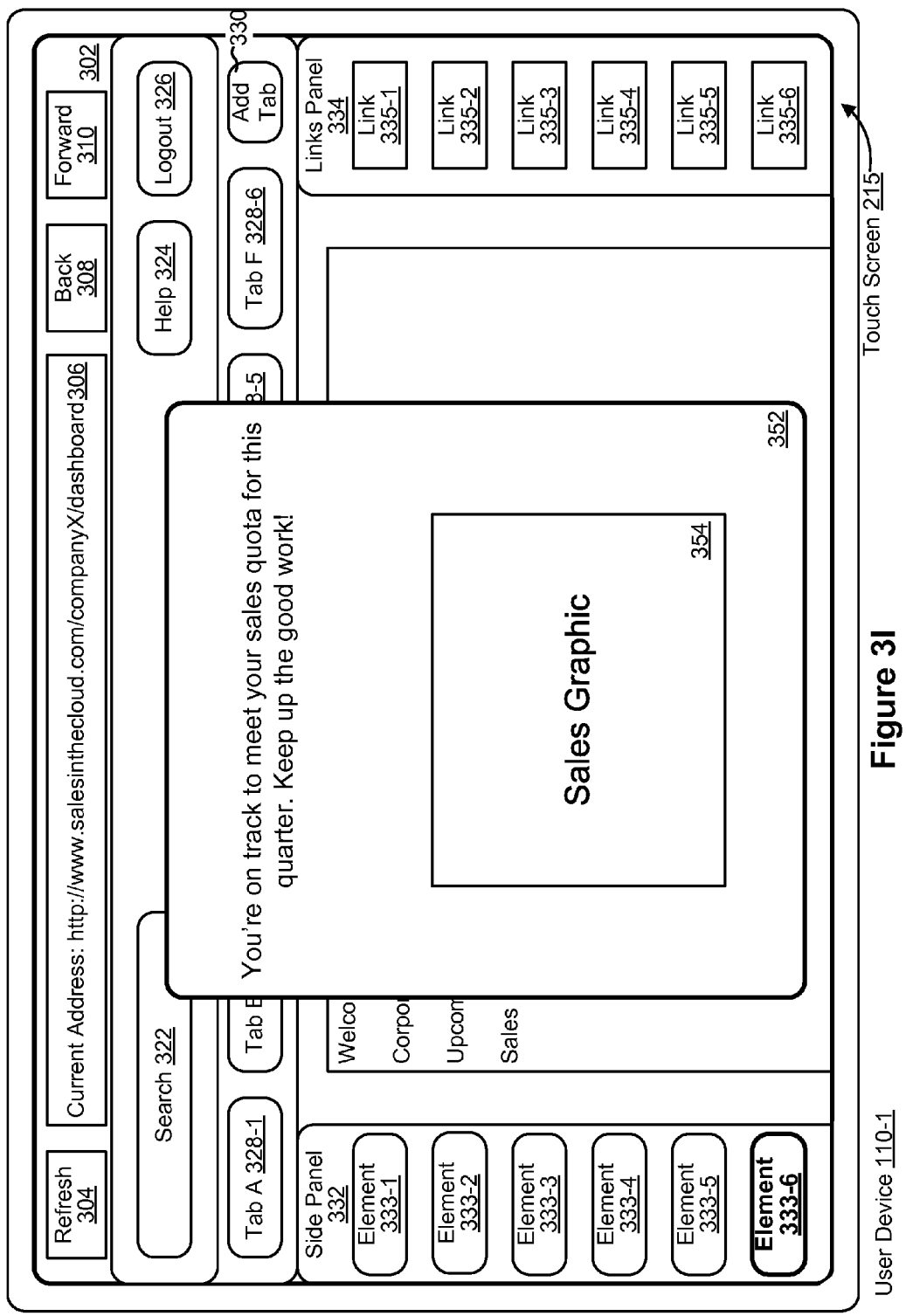

FIG. 3I illustrates user device 110-1 displaying informative materials overlaid on the proprietary landing page or dashboard (e.g., comprising a user interface) corresponding to company X on touch screen 215. In FIG. 3I, the informative materials include a pop-up message dialogue box 352 and a focus indicator configured to make element 333-6 visually distinct. For example, user interface element 333-6, when activated, causes browser 302 to show functions or statistics related to other historical sales data for the user or peers of the user.

FIG. 4 is a flow diagram illustrating a method 400 of superimposing coordinated informative materials on a web-based user interface in accordance with some embodiments. Method 400 is performed at an electronic device (e.g., server system 130-1) with one or more processors and memory. Some operations in method 400 are, optionally, combined and/or the order of some operations is, optionally, changed.

In some embodiments, user device 110-1 detects (402) a user request to access a web-based application (e.g., hosted or stored on server system 130-1) and sends the user request to server system 130-1. In some embodiments, user device 110-1 includes a web browser application 302 (e.g., shown in FIGS. 3A-3I) that is configured to enable the user of user device 110-1 to access media content, web pages, or web-based applications via one or more networks 120 (e.g., the Internet). For example, the user of user device 110-1 enters a URL (or selects a link or bookmark with the URL) associated with a web-based application into address bar 306 of web browser 302 (e.g., http://www.salesinthecloud.com/login). In response to the user entering or selecting the URL, in FIG.

3A, web browser 302 presents a login screen on touch screen 215 for a web-based application. For example, the user of user device 110-1 enters a user name in user name field 314 and a password in password field 316 and subsequently selects login button 318 (e.g., with a tap gesture). In response to detecting activation of login button 318, user device 110-1 sends an authentication request with the entered user name and password to server system 130-1 associated with the service provider of the web-based application.

Server system 130-1 receives the authentication request and determines (404) whether the user associated with the user request from user device 110-1 is authorized to access the web-based application. In response to receiving the authentication request, server system 130-1 determines whether the received user name and password are valid credentials. For example, users subscribed to the service provider are enabled access to the web-based application upon entering valid login credentials.

In accordance with a determination that the user associated with the user request is authorized to access the web-based application, server system 130-1 provides (406) the user interface corresponding to the web-based application to user device 110-1 for presentation to the user. In some embodiments, server system 130-1 provides a user interface with a plurality of user interface objects for the web-based application upon receiving a request to access the web-based application from user device 110-1 and determining that the login credentials received from user device 110-1 are valid. In some embodiments, the service provider enables subscribers to customize the user interface for the web-based application by providing subscribers with an HTML editor. This way, a subscriber can tailor the user interface for the web-based application to the needs of their business and users or employees.

In some embodiments, user device 110-1 displays (408) the user interface for the web-based application provided by server system 130-1. After being granted access to the web-based application, user device 110-1 receives and displays the user interface for the web-based application on touch screen 215. In some embodiments, a proprietary user interface for the web-based application that corresponds to the user or the user's company is displayed (e.g., the proprietary landing page or dashboard displayed on touch screen 215 in FIGS. 3A-3E).

Server system 130-1 collects (410) context information. In some embodiments, server system 130-1 collects context information before or after providing the user interface for the web-based application. For example, context information includes the URL requested by user device 110-1, and one or more of: the login and viewing history of the user, a log of the user's interactions with the web-based application, user preferences, and other such information. In some embodiments, server system 130-1 collects the context information from user device 110-1, a database local to server system 130-1, and/or an alternative database remote from both server system 130 and user device 110.

In some embodiments, context information is gathered from a cookie stored in the web browser cache of user device 110-1 (e.g., stored in context data 234). The cookie includes one or more of: historical usage information indicating the user's usage of the web-based application (e.g., time and date stamps of logins and a counter of logins), a user log of interactions with the web-based application (e.g., a log of media content provided and/or viewed by the user and a log of click or selection events), user preferences, and other information.

In some embodiments, context information also includes the URL requested by user device 110-1. In some embodiments and/or in some circumstances, the context information only includes the requested URL. For example, for a first time user of the web-based application or a web-based application that does not utilize cookies or maintain user profiles, the context information includes the URL requested by user device 110-1.

In some embodiments, context information is gathered from a user profile associated with the user of user device 110-1. In some implementations, user profiles for a plurality of users authorized to access the web-based application are stored in user profile database 276 stored at server system 130-1. In some embodiments, a user profile includes one or more of: historical usage information indicating the user's usage of the web-based application (e.g., time and date stamps of logins and a counter of logins), a user log of interactions with the web-based application (e.g., a log of media content provided and/or viewed by the user and a log of click or selection events), user preferences, and other information. In some implementations, a user profile associated with the user of user device 110-1 is stored in user profile 236 at user device 110-1, or a user profile associated with the user of user device 110-1 is stored at an alternative database remote from both server system 130 and user device 110.

Server system 130-1 determines (412) whether to provide a portion of informative materials to user device 110-1 for superimposition on the user interface of the web-based application based at least in part on the collected context information (or lack thereof). In some embodiments, server system 130-1 determines whether to provide informative materials to user device 110-1 for superimposition on the user interface of the web-based application based on context information, including information in a cookie associated with the user of user device 110-1, a uniform resource locator (URL) corresponding to the current web page or portion of the web-based application being accessed or viewed by the user of user device 110-1, and/or information in a user profile associated with the user of user device 110-1.

For example, in FIGS. 3C-3G, server system 130-1 provides informative materials to user device 110-1 based at least in part on a lack of context information, which indicates that the user is a first-time user (e.g., no cookie corresponding to the web-based application is stored in the user's web browser cache (or context data 234), and no user profile associated with the user is stored in user profile database 276). In this example, the informative materials include a video tutorial for first-time users of the web-based application with virtual agent 338, 348 pointing to and speaking of the functionalities of the plurality of user interface elements and focus indicator 340, 350 which draws the user's attention to user interface elements referenced by the video content.

Server system 130-1 determines (414) the portion of the informative materials to provide to user device 110-1 based at least in part on the collected context information. In some embodiments, server system 130-1 determines the portion of the informative materials to provide to user device 110-1 based at least in part on context information including information in a cookie associated with the user of user device 110-1, a uniform resource locator (URL) corresponding to the current web page or portion of the web-based application being accessed or viewed by the user of user device 110-1, and/or information in a user profile associated with the user of user device 110-1.

For example, in FIGS. 3C-3G, server system 130-1 provides user device 110-1 a video tutorial for first-time users of the web-based application based on the lack of context information associated with the user. Furthermore, in FIGS. 3C-3E, server system 130-1 provides user device 110-1 a portion of the video tutorial corresponding to the landing page or dashboard of a web-based application, based on the URL being accessed by the user (e.g., http://www.salesinthecloud.com/companyX/dashboard). And, in FIGS. 3F-3G, server system 130-1 provides user device 110-1 a portion of the video tutorial corresponding to Tab E 328-5 based on the URL being accessed by the user (e.g., http://www.salesinthecloud.com/companyX/tabE).

In contrast, in FIGS. 3H-3I, for example, server system 130-1 provides user device 110-1 with dialogue box 352 (e.g., indicating the user's sales progress) and a focus indicator configured to make element 333-4 visually distinct based on context information associated with the user indicating that the user is not a first-time user of the web-based application.

Server system 130-1 provides (416) the respective portion of the informative materials to user device 110-1 for presentation to the user. In some embodiments, after determining whether to provide informative materials to the user of user device 110-1 and, optionally, what portion of the informative materials to provide to the user of user device 110-1, server system 130-1 provides the portion of the informative materials to user device 110-1.

In some embodiments, device 110-1 displays (418) the informative materials overlaid on the user interface of the web-based application. FIGS. 3C-3E, for example, illustrates user device 110-1 displaying informative materials (e.g., a video tutorial for first-time users of the web-based application including virtual agent 338 and focus indicator 340) overlaid on the proprietary landing page or dashboard of a web-based application. FIGS. 3H-3I, for example, shows user device 110-1 displaying informative materials (e.g., information for a non-first-time user, including dialogue box 352 and visually distinct element 333-4, FIG. 3H) overlaid on the proprietary landing page or dashboard.

In some embodiments, device 110-1 detects (420) a user interaction with a user interface object in the user interface for the web-based application and sends a notification of the user interaction to server system 130-1. FIG. 3E, for example, shows user device 110-1 detecting contact 342 (e.g., a tap gesture) at a location corresponding to Tab E 328-5. For example, Tab E 328-5 is a user interface object or element (e.g., a button or affordance) of the user interface for the web-based application. User device 110-1 sends a notification of the selection of Tab E 328-5 to server system 130-1.

Server system 130-1 responds (422) to the user interaction by performing a function associated with the user interface object. In response to receiving the notification of the selection of Tab E 328-5, server system 130-1 provides user device 110-1 the user interface corresponding to Tab E 328-5 and informative materials corresponding to Tab E 328-5.

Optionally, method 400 includes updating user-specific portions of the context information (e.g., information stored in a user cookie and/or user profile) in accordance with the informative materials presented to the user and/or the portions of the web-based application accessed or used by the user.

It should be understood that the particular order in which the operations in FIG. 4 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 500) are also applicable in an analogous manner to method 400 described above with respect to FIG. 4.

FIGS. 5A-5C are flow diagrams illustrating a method 500 of superimposing coordinated informative materials on a web-based user interface in accordance with some embodiments. Method 500 is performed at an electronic device (e.g., server system 130-1) with one or more processors and memory. Some operations in method 500 are, optionally, combined and/or the order of some operations is, optionally, changed.

The electronic device provides (502) the user interface for presentation to a respective user, the user interface including a plurality of displayed user interface objects for initiating performance of corresponding functions of an online application (e.g., the user interface is a default or proprietary landing page for an online or web-based application). After determining that the user of user device 110-1 is authorized to access the web-based application, FIGS. 3B-3E, for example, show user device 110-1 displaying a proprietary landing page or dashboard (e.g., associated with company X) for the web-based application with a plurality of user interface objects or elements. For example, in FIGS. 3B-3E, the proprietary landing page or dashboard (e.g., a user interface) for the based-based application includes tabs 328, elements 333 in side panel 332, links 335 in links panel 334, and dialogue box 336.

The electronic device determines (504) whether to superimpose a respective portion of the informative materials (e.g., a specific tutorial or a one-time message) on the user interface, where the informative materials are distinct from the user interface. In some embodiments, server system 130-1 determines whether to provide informative materials to user device 110-1 for superimposition on the user interface for the web-based application based on context information including one or more of: information in a cookie associated with the user of user device 110-1, a uniform resource locator (URL) corresponding to the current web page or portion of the web-based application being accessed or viewed by the user of user device 110-1, and information in a user profile associated with the user of user device 110-1.

In some embodiments, the determining includes (506) determining whether to superimpose the respective portion of the informative materials on the user interface based at least in part on a cookie associated with the respective user. In some embodiments, server system 130-1 accesses a cookie (e.g., with context access module 272) associated with the user of user device 110-1. For example, context access module 272 is configured to collect context information associated with the respective user by accessing a cookie stored in the web browser cache (e.g., context data 234) associated with the user at user device 110-1.

In some embodiments, the cookie provides (508) historical usage information corresponding to the respective user. For example, the historical usage information in the cookie indicates the user's usage of the web-based application (e.g., time and date stamps of logins and a counter of logins), a user log of interactions with the web-based application (e.g., a log of media content provided and/or viewed by the user and a log of click or selection events), user preferences, and other information.

In some embodiments, the electronic device determines (510) the respective portion of the informative materials to be provided to the respective user based at least in part on the historical usage information. For example, in FIGS. 3C-3G, server system 130-1 provides a video tutorial for first-time users of the web-based application to user device 110-1 based at least in part on the lack of historical usage information indicating that the user is a first-time user (e.g., no cookie corresponding to the web-based application is stored in the user's web browser cache).

In some embodiments, the electronic device determines (512) whether the respective user has been provided with the respective portion of the informative materials based at least in part on the historical usage information. Furthermore, determining whether to superimpose a respective portion of the informative materials includes determining whether to superimpose a respective portion of the informative materials on the user interface based at least in part on whether the user has not been previously provided with the respective portion of the informative materials. In some embodiments, server system 130-1 determines whether the user has previously viewed an introductory video tutorial based on historical usage information in the cookie. For example, in FIGS. 3C-3G, server system 130-1 provides user device 110-1 with the introductory video tutorial for first-time users of the web-based application based on the lack of historical usage information associated with the user. In contrast, in FIGS. 3H-3I, for example, server system 130-1 provides user device 110-1 with dialogue box 352 (e.g., indicating the user's sales progress) and a focus indicator configured to make element 333-4 visually distinct based on historical usage information in the cookie associated with the user indicating that the user is not a first-time user of the web-based application.

In some embodiments, the determining includes (514) determining whether to superimpose the respective portion of the informative materials on the user interface based at least in part on a uniform resource locator (URL) associated with the provided user interface. In some embodiments, media content database 232 or supplemental content database 142 includes informative materials corresponding to only some of the URLs associated with portions (e.g., web pages) of the web-based application. Stated another way, media content database 232 or supplemental content database 142 includes informative materials corresponding to a subset of the URLs associated with the web-based application, where the subset is less than all of the URLs associated with the web-based application.

In some embodiments, the electronic device requests (516) a user profile associated with the respective user from a database and the determining includes determining whether to superimpose the respective portion of the informative materials on the user interface based at least in part on the user profile associated with the respective user. In some embodiments, server system 130-1 requests or obtains (e.g., retrieves or receives) the user profile associated with the user of user device 110-1 from user profile database 276 stored in server system 130-1, user profile 236 stored at user device 110-1, or an alternative database remote from both server system 130-1 and user device 110-1. In some embodiments, the user profile includes one or more of: historical usage information indicating the user's usage of the web-based application (e.g., time and date stamps of logins and a counter of logins), a user log of interactions with the web-based application (e.g., a log of media content provided and/or viewed by the user and a log of click or selection events), user preferences, and other information. In some implementations, the electronic device obtains the user profile associated with the respective user while continuing to display the web-based application's user interface (e.g., using a protocol that does not require accessing a different web page or URL than the web page or URL already being displayed at the time that operation 516 is performed).

In some embodiments, the user profile associated with the respective user identifies (518) one or more user parameters corresponding to the respective user. In some embodiments, the one or more user parameters include, but are not limited to, one or more of: geographic location, gender, performance metrics, and job title or role of the respective user.

In some embodiments, the one or more user parameters include (520) performance metrics associated with the respective user, and the media content corresponds to the performance metrics associated with the respective user. For example, in FIGS. 3H-3I, the informative materials include a pop-up message dialogue box 352. Dialogue box 352 indicates that the user is on track for his/her sales quota for the quarter based on performance metrics in the user's profile. For example, if the user is on track for his/her sales goals for the quarter, the informative materials include a "keep up the good work" message or video, but, if the user is not on track for his/her sales goals for the quarter, the informative materials include an inspirational or "need to catch up" message or video.

In some embodiments, the electronic device determines (522) the respective portion of the informative materials to be provided to the respective user based at least in part on information in a cookie associated with the respective user. For example, in FIGS. 3C-3G, server system 130-1 provides user device 110-1 with a video tutorial for first-time users of the web-based application, based on the lack of a cookie stored in the user's web browser cache (e.g., context data 236) corresponding to the web-based application. In contrast, in FIGS. 3H-3I, for example, server system 130-1 provides user device 110-1 with a pop-up message dialogue box 352 (e.g., indicating the user's sales progress) based on information in a cookie corresponding to the web-based application indicating that the user is not a first-time user of the web-based application.

In some embodiments, the electronic device determines (524) the respective portion of the informative materials to be provided to the respective user based at least in part on a uniform resource locator (URL) associated with the provided user interface. For example, in FIGS. 3C-3E, the informative materials include a video tutorial describing user interface objects or elements in the landing page or dashboard based on the URL being accessed by the user (e.g., http://www.salesinthecloud.com/companyX/dashboard). In another example, in FIG. 3F-3G, the informative materials include a video tutorial describing user interface objects or elements in Tab E 328-5 based on the URL being accessed by the user (e.g., http://www.salesinthecloud.com/companyX/tabE).

In some embodiments, the electronic device determines (526) the respective portion of the informative materials to be provided to the respective user based at least in part on the user profile associated with the respective user. For example, in accordance with the one or more parameters in the user profile, administrative personnel are greeted with a different message upon login and have access to different informative materials than executive level personnel. In another example, in accordance with the one or more parameters in the user profile, the user is provided with informative materials in his/her language or his/her regional dialect.

In accordance with a determination that the respective portion of the informative materials is to be superimposed on the user interface, the electronic device provides (528) the respective portion of the informative materials for presentation to the respective user. For example, in FIGS. 3C-3G, the informative materials include a video tutorial for first-time users of the web-based application. In FIGS. 3C-3G, the video tutorial includes a virtual agent 338, 348 pointing to and speaking of the functionalities of user interface elements of the web-based application and a focus indicator 340, 350 drawing the user's attention to user interface elements referenced by the virtual agent. In some embodiments, the informative materials are stored in informative materials database 134 at server system 130-1 (FIG. 1). In some other embodiments, the informative materials are stored in supplemental media content database 142 in third party content 140 which is separate from user device 110-1 and server system 130-1. For example, third party content 140 is hosted by a party different from the web-based software provider (e.g., by the company subscribing to web-based software provider's services) and is accessible via one or more networks 120.

Providing the respective portion of the informative materials for presentation to the respective user includes (530) providing media content (e.g., audio, text, pictures, charts/graphs, URLs, video, training tutorial, corporate news alert or message) for presentation to the respective user, where the media content is overlaid on the user interface. For example, in FIGS. 3C-3G, the informative materials include a video tutorial for first-time users with a virtual agent 338, 348 and a focus indicator 340, 350. In another example, in FIGS. 3H-3I, the informative materials include a pop-up message dialogue box 352 indicating the user's sales progress overlaid on the proprietary landing page or dashboard.

In some embodiments, the media content includes (532) video content, the video content includes a virtual agent (e.g., a displayed human tutor), and the virtual agent is overlaid on the user interface. For example, in FIGS. 3C-3G, the informative materials include a video tutorial for first-time users of the web-based application including a virtual agent 338, 348 (e.g., a human tutor) pointing to and speaking of the functionalities of user interface objects or elements in the user interface for the web-based application.

In some embodiments, the media content includes content that is (534) partially transparent, so as to enable the user to see the portions of the web-based application's user interface that coincide with transparent or semi-transparent portions of the media content. Stated another way, the provision of media content having transparent or semi-transparent portions reduces the amount of the user interface that is blocked or obscured by the media content that is superimposed over portions of the user interface. enables of the media content. In some embodiments, the media content comprises a plurality of media content regions of which one or more media content regions are transparent or semi-transparent and the remaining media content regions are not transparent or semi-transparent.

Providing the respective portion of the informative materials for presentation to the respective user includes (536) providing a focus indicator (e.g., a pointer, highlight, frame, change in aesthetic characteristic, etc.) for presentation to the respective user, where the focus indicator is configured to draw the respective user's attention to one or more user interface objects of the user interface in coordination with the media content, and where the focus indicator is overlaid on the user interface. In some embodiments, the focus indicator is an additional object or element overlaid on the user interface (e.g., a pointer or arrow). For example, in FIGS. 3C-3G, focus indicator 340, 350 is an arrow that draws the user's attention to one or more user interface objects in concert with the video tutorial. In some other embodiments, the focus indicator changes the aesthetic characteristics of an existing user interface object to draw the user's attention to one or more user interface objects. For example, in FIG. 3H, in comparison to other elements 333, the text of element 333-4 is emboldened and a larger font size and the line thickness of element 333-4 is increased.

The respective portion of the informative materials comprises (538) the media content and focus indicator provided for presentation to the user. In some embodiments, the user interface comprises the user interface of a web-based or online application (e.g., as shown in FIGS. 3B-3I), and the informative materials form no part of the web-based or online application, and instead are additional information for presentation to user. For example, in FIGS. 3C-3G, the informative materials include a video tutorial for first-time users of the web-based application including virtual agent 338, 348 pointing to and speaking of the functionalities of user interface objects or elements and focus indicator 340, 350 which draws the user's attention to user interface objects or elements referenced by the video content.

In some embodiments, in accordance with the determination that the respective portion of the informative materials is to be superimposed on the user interface, the electronic device provides (540) to the respective user a data structure (e.g., an XML file) including a sequence of time indicators (e.g., time offset values) and/or corresponding user interface locations for the focus indicator. In some embodiments, the user interface locations are coordinates or HTML identifiers for user interface objects or elements in the user interface of the web-based application. For example, the time stamps correspond to times at which the video content points to or speaks of a user interface element of the user interface. Thus, the data structure enables focus indicator 340 to be coordinated with the video content such that focus indicator 340 draws the respective user's attention to one or more user interface objects in conjunction with the video content.

TABLE 1

```
var videoPositions = {
    (5.0, "CalendarSection"),
    (10.0, "SearchInput"),
    (15.0, "Toolbar"),
    (20.0, "NavigationButton")
};
var videoURL = "http://www.companyhost.com/dev/video2.flv";
var pointerURL = "http://www.companyhost.com/dev/arrow.png";
```

For example, Table 1 illustrates a data structure including a sequence of time indicators (e.g., 5.0, 10.0, 15.0, 20.0 seconds) and corresponding user interface location for the focus indicator (e.g., HTML identifiers corresponding to user interface elements of the web-based application, including Calendar Section, Search Input, Toolbar, and Navigation Button) so as to coordinate the focus indicator with the media content. In some embodiments, coordinate pairs are used in place of HTML identifiers. In some embodiments, the data structure further includes a URL to the media content (e.g., http://www.companyhost.com/dev/video2.flv) and a URL to an image or graphic for the focus indicator (e.g., http://www.companyhost.com/dev/arrow.png). For example, the media context and the image or graphic for the focus indicator are stored in supplemental media content database 142 of third party content provider 140 (e.g., associated with http://www.companyhost.com). In some embodiments, the data structure is embedded into the web-based application and is triggered when context information related to the user meets certain predefined criteria (e.g., the user is a first time user with a lack of context information, or the user has a certain job description or authorization credentials).

In some embodiments, the corresponding user interface locations for the focus indicator include (542) at least one set of coordinates corresponding to a user interface location and at least one user interface object identifier. In some embodiments, the user interface locations include at least one set of coordinates associated with a user interface object or element in the user interface of the web-based application and at least one user interface object identifier (e.g., an HTML identifier)

associated with a user interface object or element in the user interface of the web-based application.

In some embodiments, the electronic device moves (544) the focus indicator from a first location of the user interface to a second location of the user interface in coordination with the media content. FIGS. 3C-3D, for example, show movement of focus indicator 340 from a location corresponding to a daily corporate message in dialogue box 336 to a location corresponding to Tab A 328-1 as the video tutorial (e.g., the virtual agent) transitions from explaining the functionality of daily corporate message to explaining the functionality of Tab A 328-1.

The electronic device responds (546) to user interaction with any of the plurality of displayed user interface objects by performing corresponding functions of the online application (e.g., the user interface for the web-based application is a "live" or fully functional user interface). FIG. 3E, for example, shows user device 110-1 detecting contact 342 at a location corresponding to Tab E 328-5. FIG. 3F, for example, shows user device 110-1 displaying functions or services corresponding to Tab E 328-5 on touch screen 215 in response to detecting selection of Tab E 328-5 in FIG. 3E.

It should be understood that the particular order in which the operations in FIGS. 5A-5C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 400) are also applicable in an analogous manner to method 500 described above with respect to FIGS. 5A-5C.

It will also be understood that, although the terms "first," "second," are, in some circumstances, used herein to describe various elements, these elements should not be limited by these terms. These terms are only used to distinguish one element from another. For example, a first user interface element could be termed a second user interface element, and, similarly, a second user interface element could be termed a first user interface element, which changing the meaning of the description, so long as all occurrences of the "first user interface element" are renamed consistently and all occurrences of the "second user interface element" are renamed consistently. The first user interface element and the second user interface element are both user interface elements, but they are not the same user interface element.

The terminology used herein is for the purpose of describing particular implementations only and is not intended to be limiting of the claims. As used in the description of the implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and non-transitory computer readable storage media that embody illustrative implementations. For purposes of explanation, numerous specific details were set forth in order to provide an understanding of various implementations of the inventive subject matter. It will be evident, however, to those skilled in the art that implementations of the inventive subject matter is, optionally, practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method of determining informative materials for superimposition on a user interface of an online application, the method comprising:
   at a server system with one or more processors and memory:
      providing the user interface to the client device for presentation to a respective user, the user interface including a plurality of displayed user interface objects for initiating performance of corresponding functions of the online application;
      obtaining, from a database, a user profile corresponding to the respective user, wherein the user profile includes one or more performance metrics of the respective user;
      determining whether to provide the informative materials to the client device for superimposition on the user interface based at least in part on the user profile corresponding to the respective user, wherein the informative materials are distinct from the user interface;
      in accordance with a determination that the respective portion of the informative materials is to be superimposed on the user interface:
         determining a respective portion of the informative materials to be provided to the client device based at least in part on the one or more performance metrics of the respective user; and
         providing the respective portion of the informative materials to a client device for presentation to the respective user, including:
            providing media content to a client device for presentation to the respective user, wherein the media content is overlaid on the user interface; and
            providing a focus indicator to a client device for presentation to the respective user, wherein the focus indicator is distinct and separate from the media content, the focus indicator is configured to draw the respective user's attention to one or more user interface objects of the user interface in coordination with the media content, and the focus indicator is overlaid on the user interface; and responding to user interaction with any of the plurality of displayed user interface objects by performing corresponding functions of the online application;

wherein the respective portion of the informative materials comprises the media content and focus indicator provided for presentation to the user.

2. The method of claim 1, wherein determining the respective portion of the informative materials to be provided to the client device comprises determining the respective portion of the informative materials to be provided to the client device based at least in part on the one or more performance metrics of the respective user and a job title or job role of the respective user.

3. The method of claim 1, further comprising:
providing a data structure to the client device including a sequence of time indicators and corresponding user interface locations for the focus indicator to coordinate locations of the focus indicator with content of the media content.

4. The method of claim 3, wherein the corresponding user interface locations for the focus indicator include at least one set of coordinates corresponding to a user interface location and at least one user interface object identifier.

5. The method of claim 3, wherein the data structure is distinct from an application executed at the client device to present the informative materials to the respective user.

6. The method of claim 1, wherein the media content includes video content that is partially transparent, wherein the video content includes a virtual agent, and wherein the virtual agent is overlaid on the user interface of the online application.

7. The method of claim 1, including, requesting the user profile associated with the respective user from the database.

8. A server, comprising:
one or more processors; and
memory storing one or more programs to be executed by the one or more processors, the one or more programs comprising instructions for:
providing an user interface of an online application to the client device for presentation to a respective user, the user interface including a plurality of displayed user interface objects for initiating performance of corresponding functions of the online application;
obtaining, from a database, a user profile corresponding to the respective user, wherein the user profile includes one or more performance metrics of the respective user;
determining whether to provide the informative materials to the client device for superimposition on the user interface based at least in part on the user profile corresponding to the respective user, wherein the informative materials are distinct from the user interface;
in accordance with a determination that the respective portion of the informative materials is to be superimposed on the user interface:
determining a respective portion of the informative materials to be provided to the client device based at least in part on the one or more performance metrics of the respective user; and providing the respective portion of the informative materials to a client device for presentation to the respective user, including:
providing media content to a client device for presentation to the respective user, wherein the media content is overlaid on the user interface; and
providing a focus indicator to a client device for presentation to the respective user, wherein the focus indicator is distinct and separate from the media content, the focus indicator is configured to draw the respective user's attention to one or more user interface objects of the user interface in coordination with the media content, and the focus indicator is overlaid on the user interface; and responding to user interaction with any of the plurality of displayed user interface objects by performing corresponding functions of the online application;

wherein the respective portion of the informative materials comprises the media content and focus indicator provided for presentation to the user.

9. The server system of claim 8, wherein determining the respective portion of the informative materials to be provided to the client device comprises determining the respective portion of the informative materials to be provided to the client device based at least in part on the one or more performance metrics of the respective user and a job title or job role of the respective user.

10. The server system of claim 8, wherein the one or more programs further comprise instructions for:
providing a data structure to the client device including a sequence of time indicators and corresponding user interface locations for the focus indicator to coordinate locations of the focus indicator with content of the media content.

11. The server system of claim 10, wherein the corresponding user interface locations for the focus indicator include at least one set of coordinates corresponding to a user interface location and at least one user interface object identifier.

12. The server system of claim 10, wherein the data structure is distinct from an application executed at the client device to present the informative materials to the respective user.

13. The server system of claim 8, wherein the one or more programs comprise instructions for moving the focus indicator from a first location of the user interface to a second location of the user interface in coordination with the media content.

14. The server system of claim 8, wherein the media content includes video content that is partially transparent, wherein the video content includes a virtual agent, and wherein the virtual agent is overlaid on the user interface of the online application.

15. The server system of claim 8, wherein the one or more programs further comprise instructions for:
requesting the user profile associated with the respective user from the database.

16. A non-transitory computer readable storage medium storing one or more programs, the one or more programs comprising instructions, which, when executed by a server system with one or more processors, cause the server system to perform operations comprising:
providing the user interface of an online application to the client device for presentation to a respective user, the user interface including a plurality of displayed user interface objects for initiating performance of corresponding functions of the online application;

obtaining, from a database, a user profile corresponding to the respective user, wherein the user profile includes one or more performance metrics of the respective user;

determining whether to provide the informative materials to the client device for superimposition on the user interface based at least in part on the user profile corresponding to the respective user, wherein the informative materials are distinct from the user interface;

in accordance with a determination that the respective portion of the informative materials is to be superimposed on the user interface:

determining a respective portion of the informative materials to be provided to the client device based at least in part on the one or more performance metrics of the respective user; and providing the respective portion of the informative materials to a client device for presentation to the respective user, including:

providing media content to a client device for presentation to the respective user, wherein the media content is overlaid on the user interface; and providing a focus indicator to a client device for presentation to the respective user, wherein the focus indicator is distinct and separate from the media content, the focus indicator is configured to draw the respective user's attention to one or more user interface objects of the user interface in coordination with the media content, and the focus indicator is overlaid on the user interface; and responding to user interaction with any of the plurality of displayed user interface objects by performing corresponding functions of the online application;

wherein the respective portion of the informative materials comprises the media content and focus indicator provided for presentation to the user.

17. The non-transitory computer readable storage medium of claim 16, wherein determining the respective portion of the informative materials to be provided to the client device comprises determining the respective portion of the informative materials to be provided to the client device based at least in part on the one or more performance metrics of the respective user and a job title or job role of the respective user.

18. The non-transitory computer readable storage medium of claim 16, wherein the instructions cause the server system to perform operations further comprising:

providing a data structure to the client device including a sequence of time indicators and corresponding user interface locations for the focus indicator to coordinate locations of the focus indicator with content of the media content.

19. The non-transitory computer readable storage medium of claim 18, wherein the corresponding user interface locations for the focus indicator include at least one set of coordinates corresponding to a user interface location and at least one user interface object identifier.

20. The non-transitory computer readable storage medium of claim 18, wherein the data structure is distinct from an application executed at the client device to present the informative materials to the respective user.

21. The non-transitory computer readable storage medium of claim 16, wherein the one or more programs comprise instructions moving the focus indicator from a first location of the user interface to a second location of the user interface in coordination with the media content.

22. The non-transitory computer readable storage medium of claim 16, wherein the media content includes video content that is partially transparent, wherein the video content includes a virtual agent, and wherein the virtual agent is overlaid on the user interface of the online application.

23. The non-transitory computer readable storage medium of claim 16, wherein the instructions cause the server system to perform operations further comprising:

requesting the user profile associated with the respective user from the database.

* * * * *